(12) United States Patent
Ito et al.

(10) Patent No.: US 8,970,678 B2
(45) Date of Patent: Mar. 3, 2015

(54) COMPUTER-READABLE STORAGE MEDIUM, IMAGE DISPLAY APPARATUS, SYSTEM, AND METHOD

(75) Inventors: Yuichiro Ito, Kyoto (JP); Yuki Nishimura, Kai (JP)

(73) Assignees: Nintendo Co., Ltd., Kyoto (JP); Hal Laboratory, Inc., Tokyo (JP)

( * ) Notice: Subject to any disclaimer, the term of this patent is extended or adjusted under 35 U.S.C. 154(b) by 923 days.

(21) Appl. No.: 13/153,784

(22) Filed: Jun. 6, 2011

(65) Prior Publication Data

US 2011/0304699 A1    Dec. 15, 2011

(30) Foreign Application Priority Data

Jun. 14, 2010   (JP) .................................. 2010-135589

(51) Int. Cl.
*H04N 13/02* (2006.01)
*A63F 13/40* (2014.01)
*H04N 13/00* (2006.01)

(52) U.S. Cl.
CPC ............ *A63F 13/10* (2013.01); *H04N 13/0014* (2013.01); *A63F 2300/1093* (2013.01); *A63F 2300/204* (2013.01); *A63F 2300/301* (2013.01); *A63F 2300/306* (2013.01); *A63F 2300/6669* (2013.01); *A63F 2300/6676* (2013.01); *A63F 2300/69* (2013.01)
USPC ........................................................... 348/47

(58) Field of Classification Search
CPC ....................... A63F 2300/69; H04N 13/0014
See application file for complete search history.

(56) References Cited

U.S. PATENT DOCUMENTS

| 2002/0113756 A1* | 8/2002 | Tuceryan et al. ................. 345/8 |
| 2004/0233275 A1* | 11/2004 | Tomita ............................ 348/51 |
| 2009/0237492 A1* | 9/2009 | Kikinis et al. .................. 348/47 |

FOREIGN PATENT DOCUMENTS

JP         2008-146109         6/2008

OTHER PUBLICATIONS

Kato et al., "Marker Tracking and HMD Calibration for a Video-based Augmented Reality Conferencing System", IWAR, pp. 85, $2^{nd}$ IEEE and ACM International Workshop on Augmented Reality, 1999, 10 pages.

* cited by examiner

*Primary Examiner* — Andy Rao
*Assistant Examiner* — Tyler Edwards
(74) *Attorney, Agent, or Firm* — Nixon & Vanderhye PC

(57) ABSTRACT

First, a stereoscopic vision reference distances is individually determined for each virtual object disposed in a virtual space, based on a depth position of each of the virtual objects. Next, each of the virtual objects is rendered and combined based on one pair of virtual cameras such that a relative position, with respect to the screen of a stereoscopic display device, of a virtual object, viewed by a user through a screen of the stereoscopic display device, matches a relative position of the virtual object with respect to a stereoscopic vision reference surface for the virtual object in the virtual space.

27 Claims, 30 Drawing Sheets

FIG. 4
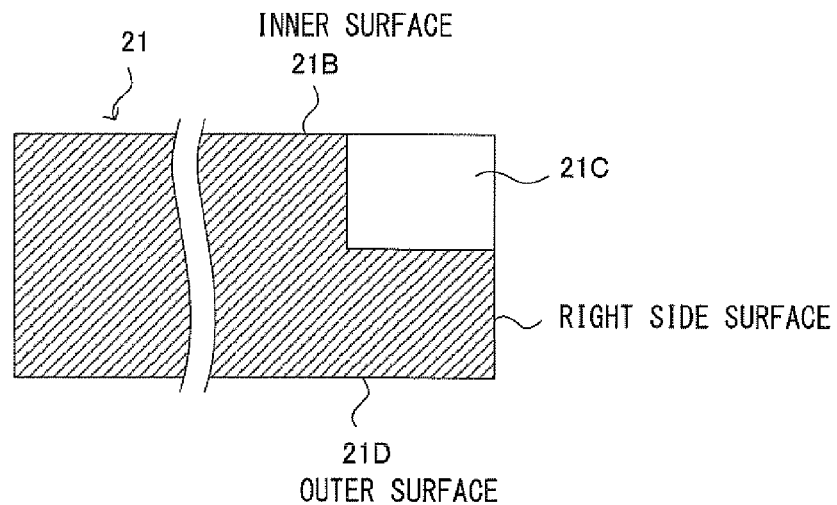
FIG. 5A    FIG. 5B
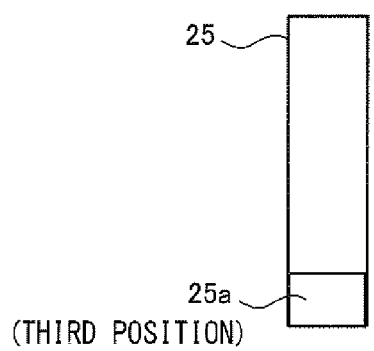    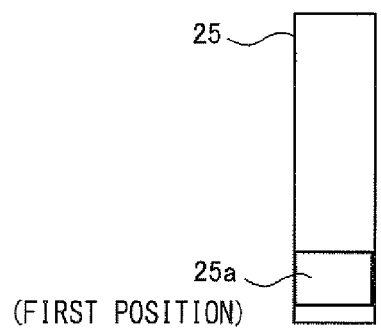
FIG. 5C
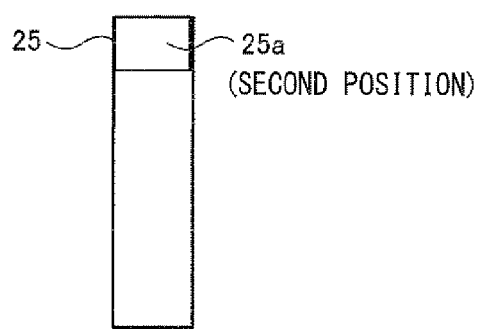

F I G. 8
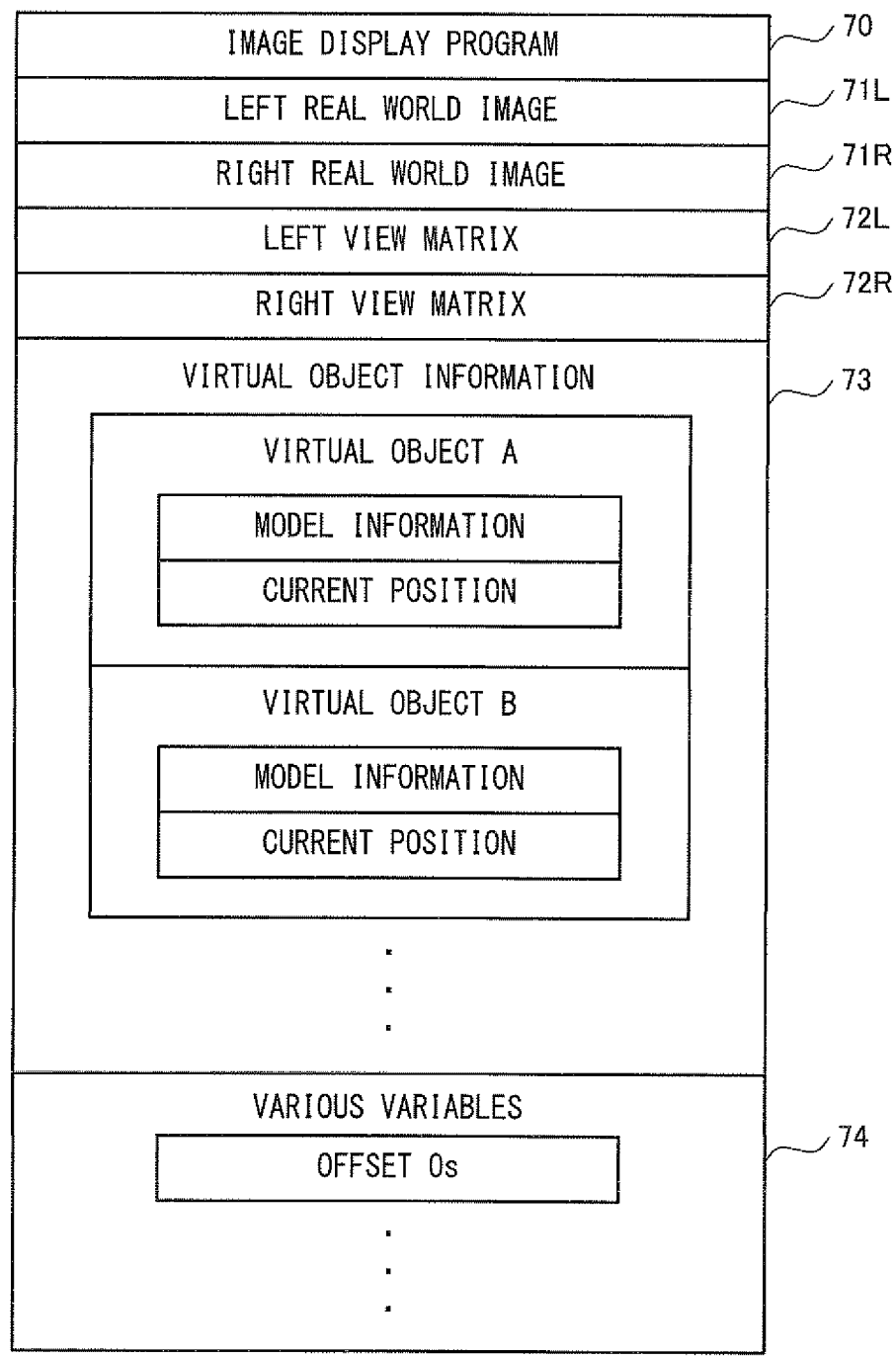

POINT OF ORIGIN IN
MARKER COORDINATE
SYSTEM

F I G. 2 3
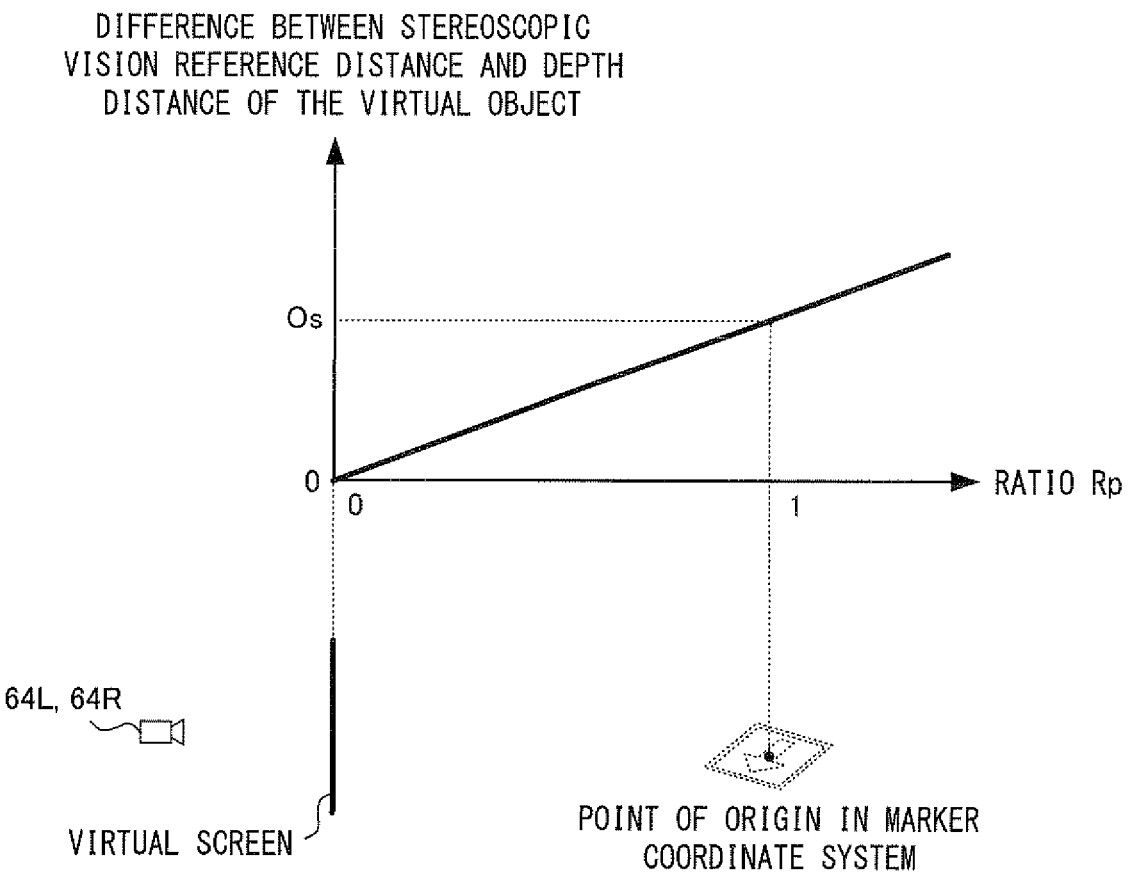

F I G. 3 1
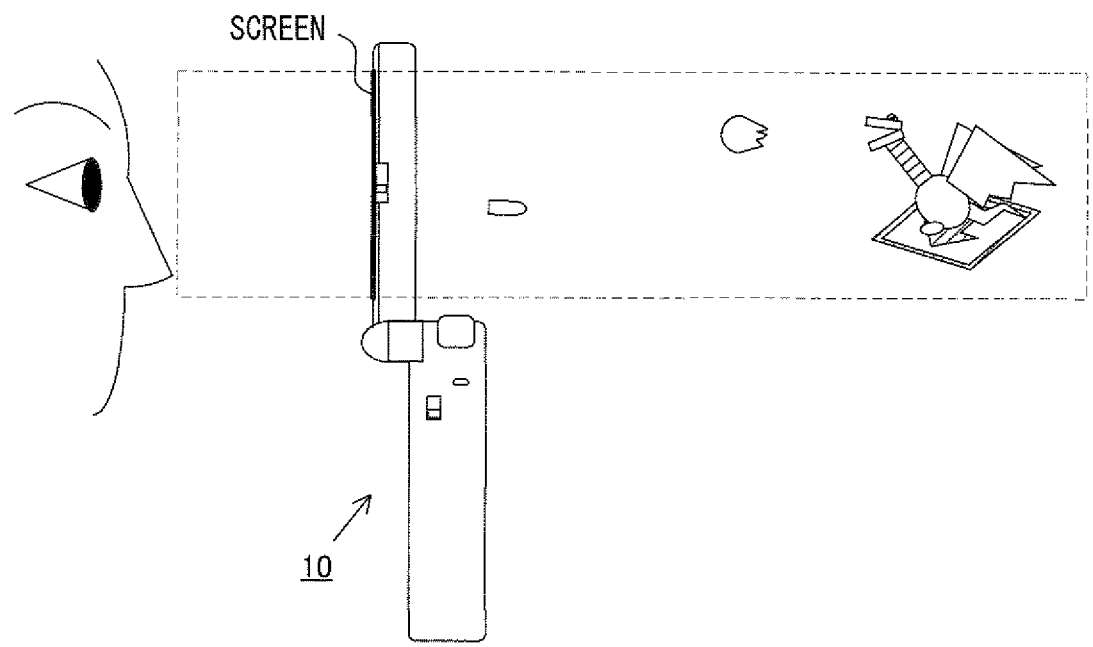
F I G. 3 2
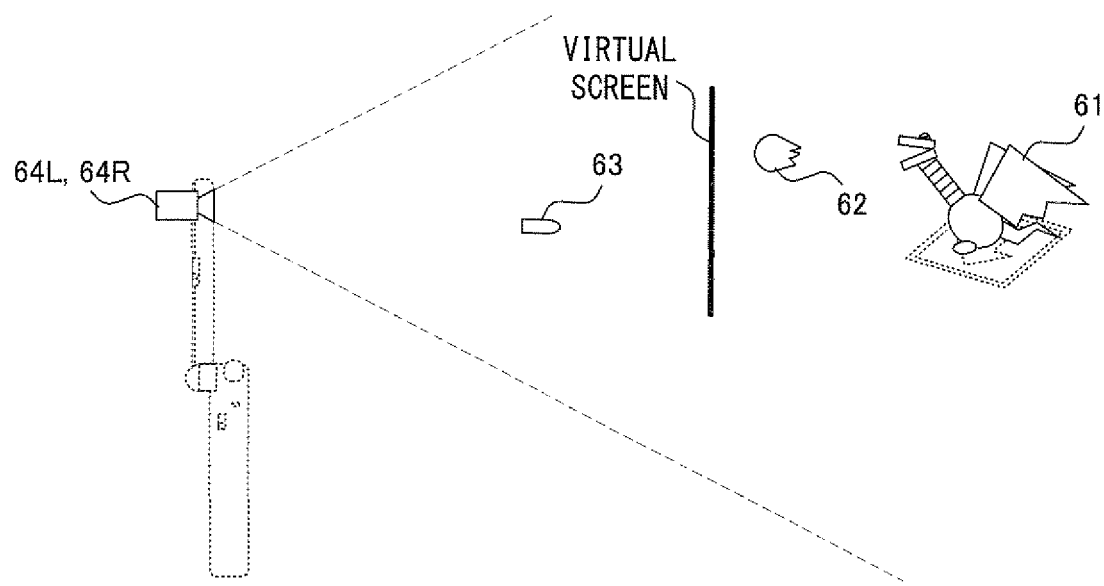

F I G. 3 3
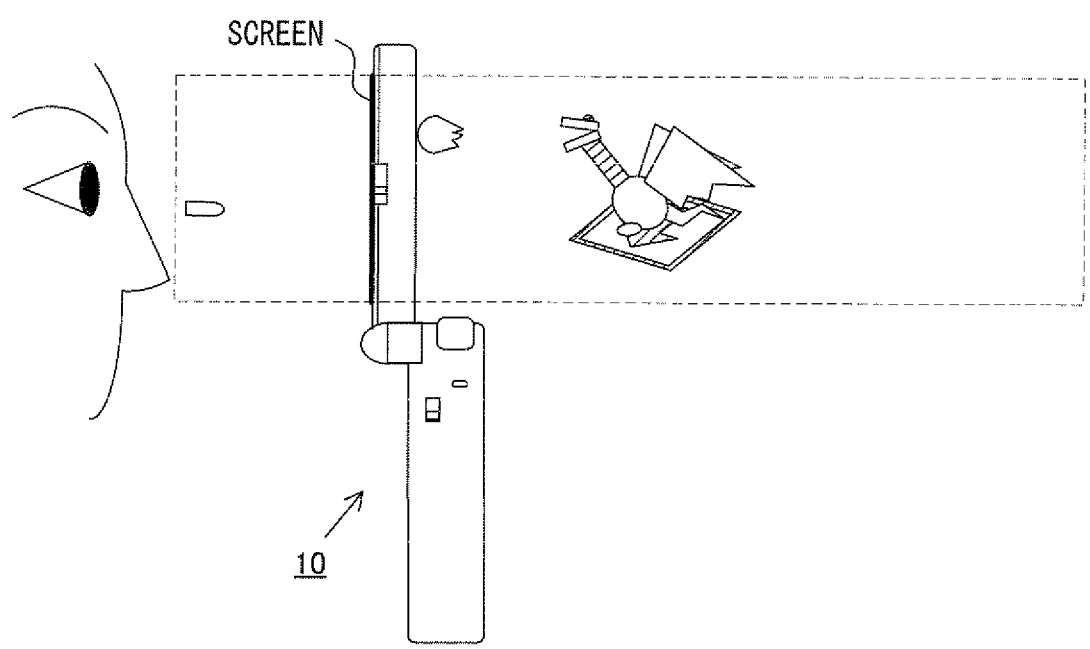

F I G. 3 4
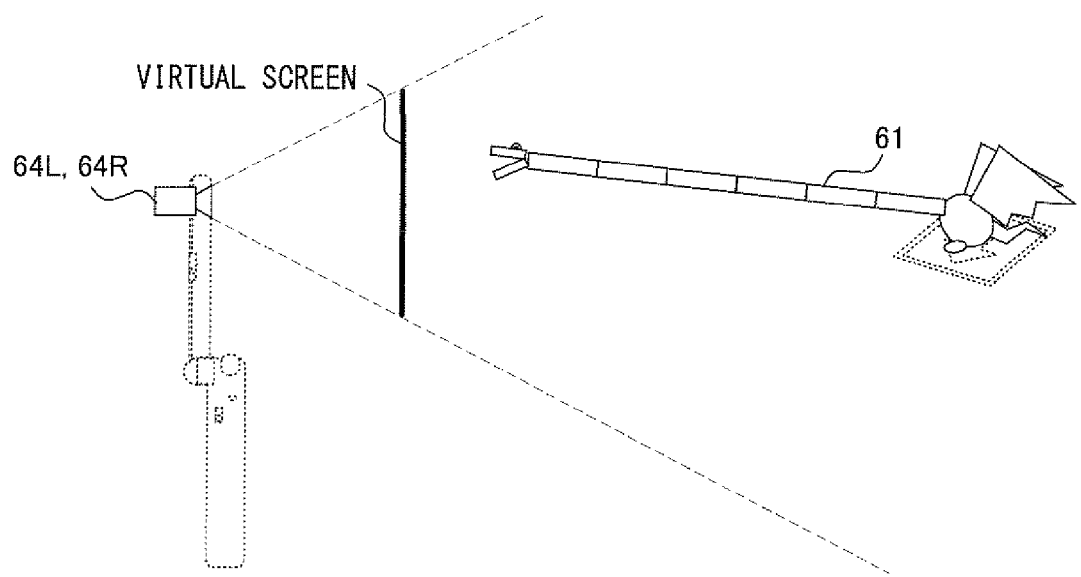
F I G. 3 5
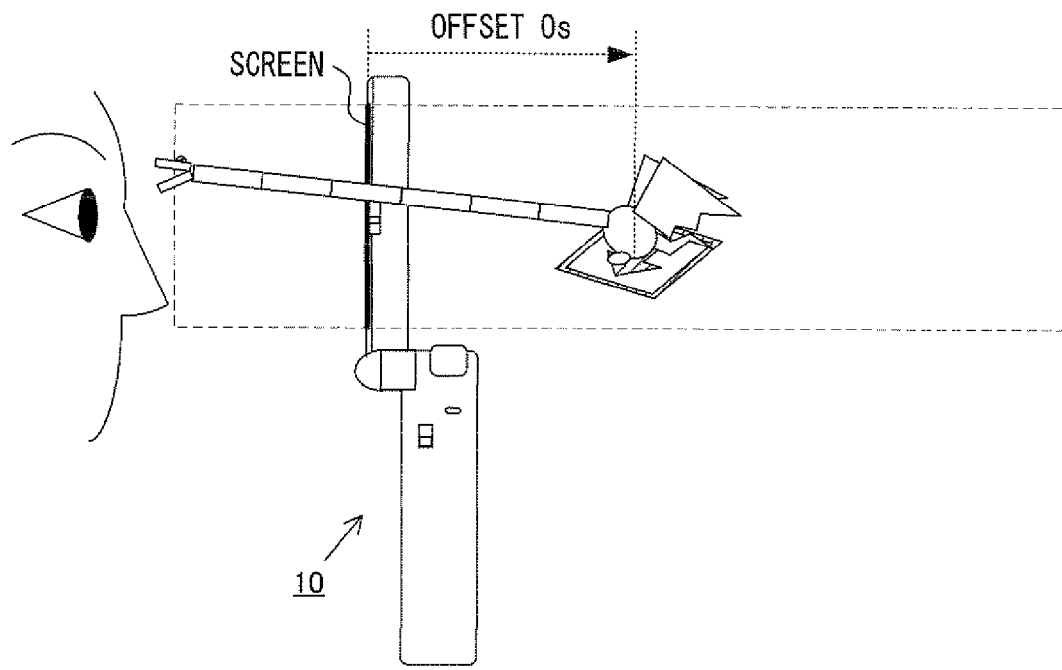

COMPUTER-READABLE STORAGE MEDIUM, IMAGE DISPLAY APPARATUS, SYSTEM, AND METHOD

CROSS REFERENCE TO RELATED APPLICATION

The disclosure of Japanese Patent Application No. 2010-135589, filed on Jun. 14, 2010, is incorporated herein by reference.

BACKGROUND OF THE INVENTION

1. Field of the Invention

The present invention relates to a computer-readable storage medium, an image display apparatus, system, and method; and in particular, relates to a computer-readable storage medium, an image display apparatus, system, and method for stereoscopically displaying a virtual object on a screen of a stereoscopic-viewing-enabling stereoscopic display device.

2. Description of the Background Art

In recent years, there has been advances in the research of AR (Augmented Reality) technology which enables displaying a virtual object as if it actually exists in the real world by combining and displaying the virtual object with an image of the real world.

For example, in a stereoscopic display device disclosed in patent literature 1 (Japanese Laid-Open Patent Publication No. 2008-146109), images taken respectively by a right-eye camera and a left-eye camera attached to a head mounted display are used to obtain respective relative positions and attitudes of the right-eye camera and the left-eye camera with regard to a marker disposed in the real space, and based on the obtained result, an image of a virtual object for the right eye and an image of the virtual object for the left eye are respectively generated. Then, the images respectively taken by the right-eye camera and the left-eye camera are respectively combined with the image of the virtual object for the right eye and the image of the virtual object for the left eye, and the combined images are respectively displayed on a right-eye LCD (liquid crystal display) and a left-eye LCD.

In addition, non-patent literature 1 (Hirokazu Kato, Mark Billinghurst, "Marker Tracking and HMD Calibration for a Video-Based Augmented Reality Conferencing System," IWAR, pp. 85, 2nd IEEE and ACM International Workshop on Augmented Reality, 1999) discloses a method for calculating relative positions and relative attitudes of a camera and a marker in the real world, based on the position and attitude of the marker in an image taken by the camera.

With the stereoscopic display device disclosed in patent literature 1, basically, the virtual object is merely stereoscopically displayed such that the virtual object appears to be at a position identical to the marker. However, for example, when another virtual object is arranged at a position that appears to be considerably closer in the foreground than the marker, and when an image of this virtual object arranged at a position away from the marker and an image of the virtual object arranged at the position identical to the marker are both taken by a virtual camera, there are cases where a difference between an amount of display-deviation (an amount of display-deviation that enables stereoscopic vision) on the screen for one of the virtual objects and an amount of display-deviation on the screen for the other virtual object becomes large, and thereby making it difficult for the user to view the virtual objects.

SUMMARY OF THE INVENTION

Therefore, an objective of the present invention is to provide a computer-readable storage medium, an image display apparatus, system, and method, capable of stereoscopically displaying a virtual object on a stereoscopic display device in a manner allowing the user to easily view the virtual object stereoscopically.

In order to solve the problem described above, the following configuration is adopted for the present invention.

A computer-readable storage medium of The present invention is a computer-readable storage medium having store thereon an image display program for stereoscopically displaying a virtual object, which is disposed in a virtual space, on a screen of a stereoscopic-viewing-enabling stereoscopic display device via a rendition of the virtual object with a usage of one pair of virtual cameras; and the image display program causes a computer to operate as stereoscopic vision reference distance determination means, virtual camera setting means, and stereoscopic display control means. The stereoscopic vision reference distance determination means determines a stereoscopic vision reference distance, which is a distance in an imaging direction from the one pair of virtual cameras and which is used as a reference for a sense of depth of stereoscopic vision, so as to change in accordance with an imaging distance which is a distance from the virtual cameras to the virtual object in the imaging direction. The virtual camera setting means sets the one pair of virtual cameras such that each of which obtains a view volume providing a predetermined sense of depth for the stereoscopic vision reference distance determined by the stereoscopic vision reference distance determination means. The stereoscopic display control means stereoscopically displays the virtual object on the screen of the stereoscopic display device by using one pair of virtual images generated by imaging the virtual object with the one pair of virtual cameras set by the virtual camera setting means.

With this, the sense of depth that a user perceives when viewing the virtual object through the screen of the stereoscopic display device can be properly set.

The predetermined sense of depth may be a sense of depth matching that obtained from the screen of the stereoscopic display device.

Furthermore, the image display program may further cause the computer to operate as recognition means for recognizing, among one pair of real world images taken by one pair of imaging sections, a predetermined recognition target from at least one of the real world images; and positional relationship determination means for determining a relative positional relationship between the one pair of virtual cameras and a predetermined point corresponding to the recognition target in the virtual space, based on a position of the recognition target in the at least one of the real world images. In addition, the stereoscopic vision reference distance determination means determines the stereoscopic vision reference distance in accordance with a difference between the imaging distance and a distance from the one pair of virtual cameras to the predetermined point in the imaging direction.

Furthermore, the stereoscopic vision reference distance determination may determine the stereoscopic vision reference distance in accordance with a difference between the imaging distance and a first basis distance which is a basis for determining the stereoscopic vision reference distance.

Furthermore, as the imaging distance becomes larger than a first basis distance, the stereoscopic vision reference distance determination means may determine the stereoscopic vision reference distance so as to be closer to the imaging distance than the first basis distance.

Furthermore, when a plurality of virtual objects exist in the virtual space, the stereoscopic vision reference distance determination means may individually determine a stereoscopic vision reference distance for each of the plurality of virtual objects; and the stereoscopic display control means may generate the virtual image by respectively generating images of the plurality of virtual objects by individually rendering the plurality of virtual objects based on respective stereoscopic vision reference distances, and by combining the obtained images of the plurality of virtual objects.

With this, the sense of depth of each of the virtual objects viewed by the user can be individually set properly.

Furthermore, as a depth position of the virtual object shifts closer from a first depth position to a second depth position that is disposed on a side on which the one pair of virtual cameras exist with respect to the first depth position, the stereoscopic vision reference distance determination means may determine the stereoscopic vision reference distance for the virtual object such that a position at the stereoscopic vision reference distance shifts closer to that of the one pair of virtual cameras and such that a relative position of the virtual object with respect to the stereoscopic vision reference distance shifts toward a side on which the one pair of virtual cameras exist.

With this, since the virtual space appears to the user as if it has been compressed in the depth direction of the screen, the user can easily focus both eyes on the virtual object.

Furthermore, when the virtual object is disposed at a predetermined depth position, the stereoscopic vision reference distance determination means may determine the stereoscopic vision reference distance for the virtual object such that a relative position of the virtual object with respect to the stereoscopic vision reference distance becomes a predetermined relative position.

With this, a virtual object at a predetermined depth distance in the virtual space will appear to the user as being at a predetermined depth distance.

Furthermore, the stereoscopic vision reference distance determination means may: when the virtual object is disposed at a first depth position, determine the stereoscopic vision reference distance for the virtual object such that a relative position of the virtual object with respect to the stereoscopic vision reference distance becomes a first relative position; when the virtual object is disposed at a second depth position, determine the stereoscopic vision reference distance for the virtual object such that the relative position of the virtual object with respect to the stereoscopic vision reference distance becomes a second relative position; and when the virtual object is disposed between the first depth position and the second depth position, determine the stereoscopic vision reference distance for the virtual object in accordance with a relative position of the virtual object with respect to the first depth position and the second depth position.

With this, a virtual object disposed within a range from the first depth position to the second depth position can be stereoscopically displayed properly.

Furthermore, when the virtual object is disposed between the first depth position and the second depth position, the stereoscopic vision reference distance determination means may determine the stereoscopic vision reference distance for the virtual object based on a ratio of a distance between the first depth position and the second depth position and a distance between the depth position of the virtual object and the second depth position.

Furthermore, the second depth position may be disposed further toward a side of the one pair of virtual cameras than the first depth position, and the second relative position may be disposed further toward a side of the one pair of virtual cameras than the first relative position.

Furthermore, the second relative position is a relative position in which a depth position at the stereoscopic vision reference distance is identical to that of the virtual object.

With this, a virtual object at the second depth position will appear to the user as being consistently at a depth distance identical to the screen of the stereoscopic display device.

Furthermore, a relative positional relationship between the first depth position and the second depth position may change depending on the situation.

With this, even when the situation changes, the sense of depth that the user perceives when viewing the virtual object can be set properly.

Furthermore, a relative position of the first depth position with respect to the one pair of virtual cameras may be variable, and the relative position of the second depth position with respect to the one pair of virtual cameras may be fixed.

Furthermore, the image display program may further cause the computer to operate as: recognition means for recognizing, among one pair of real world images taken by one pair of imaging sections, a predetermined recognition target from at least one of the real world images; and positional relationship determination means for determining a relative positional relationship between the one pair of virtual cameras and the first depth position, based on a position of the recognition target in the at least one of the real world images.

With this, even when the positional relationship between the one pair of imaging sections and the predetermined recognition target is changed, the sense of depth of the virtual object viewed from the user can be set properly.

Furthermore, the stereoscopic display control means may generate a stereoscopic image to be displayed on the stereoscopic display device, by sequentially combining the one pair of the real world images respectively with one pair of images of the virtual object sequentially generated by using the one pair of virtual cameras.

With this, the virtual object can be stereoscopically displayed as if it exists in the real world.

Furthermore, the image display program may further cause the computer to operate as first relative position determination means for determining the first relative position in accordance with a distance between the one pair of virtual cameras and the first depth position.

Furthermore, the stereoscopic display control means may generate a stereoscopic image of the virtual object in accordance with the stereoscopic vision reference distance determined by the stereoscopic vision reference distance determination means by changing a stereoscopic vision reference point which is a point at the stereoscopic vision reference distance and which is distant equally from the one pair of virtual cameras.

With this, the virtual object can be stereoscopically displayed such that it will appear normal.

An image display apparatus of the present invention is for stereoscopically displaying a virtual object, which is disposed in a virtual space, on a screen of a stereoscopic-viewing-enabling stereoscopic display device via a rendition of the virtual object with a usage of one pair of virtual cameras. The image display apparatus includes: stereoscopic vision reference distance determination means for determining a stereoscopic vision reference distance, which is a distance in an imaging direction from the one pair of virtual cameras and which is used as a reference for a sense of depth of stereoscopic vision, so as to change in accordance with an imaging distance which is a distance from the virtual cameras to the virtual object in the imaging direction; virtual camera setting means for setting the one pair of virtual cameras such that each of which obtains a view volume providing a predetermined sense of depth for the stereoscopic vision reference distance determined by the stereoscopic vision reference distance determination means; and stereoscopic display control means for stereoscopically displaying the virtual object on the screen of the stereoscopic display device by using one pair of virtual images generated by imaging the virtual object with the one pair of virtual cameras set by the virtual camera setting means.

An image display system of the present invention is for stereoscopically displaying a virtual object, which is disposed in a virtual space, on a screen of a stereoscopic-viewing-enabling stereoscopic display device via a rendition of the virtual object with a usage of one pair of virtual cameras. The image display system includes stereoscopic vision reference distance determination means for determining a stereoscopic vision reference distance, which is a distance in an imaging direction from the one pair of virtual cameras and which is used as a reference for a sense of depth of stereoscopic vision, so as to change in accordance with an imaging distance which is a distance from the virtual cameras to the virtual objects in the imaging direction; virtual camera setting means for setting the one pair of virtual cameras such that each of which obtains a view volume providing a predetermined sense of depth for the stereoscopic vision reference distance determined by the stereoscopic vision reference distance determination means; and stereoscopic display control means for stereoscopically displaying the virtual object on the screen of the stereoscopic display device by using one pair of virtual images generated by imaging the virtual object with the one pair of virtual cameras set by the virtual camera setting means.

An image display method of the present invention is for stereoscopically displaying a virtual object, which is disposed in a virtual space, on a screen of a stereoscopic-viewing-enabling stereoscopic display device via a rendition of the virtual object with a usage of one pair of virtual cameras. The image display method includes: a stereoscopic vision reference distance determination step of determining a stereoscopic vision reference distance, which is a distance in an imaging direction from the one pair of virtual cameras and which is used as a reference for a sense of depth of stereoscopic vision, so as to change in accordance with an imaging distance which is a distance from the virtual cameras to the virtual object in the imaging direction; a virtual camera setting step of setting the one pair of virtual cameras such that each of which obtains a view volume that provides a predetermined sense of depth for the stereoscopic vision reference distance determined at the stereoscopic vision reference distance determination step; and a stereoscopic display control step of stereoscopically displaying the virtual object on the screen of the stereoscopic display device with a usage of one pair of virtual images generated from images of the virtual object obtained by the one pair of virtual cameras set at the virtual camera setting step.

With the present invention, a virtual object can be stereoscopically displayed on a stereoscopic display device in a manner allowing the user to easily view the virtual object stereoscopically.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a cross sectional view of an upper housing 21 shown in FIG. 1 along line A-A';

FIG. 5A is a diagram illustrating a state in which a slider 25a of a 3D adjustment switch 25 is positioned at a lowermost position (a third position);

FIG. 5B is a diagram illustrating a state in which the slider 25a of the 3D adjustment switch 25 is positioned above the lowermost position (a first position);

FIG. 5C is a diagram illustrating a state in which the slider 25a of the 3D adjustment switch 25 is positioned at an uppermost position (a second position);

FIG. 8 is a diagram illustrating a memory map of a main memory 32 of the game apparatus 10;

FIG. 23 is a diagram illustrating one example of a correspondence relationship between a ratio Rp and a relative depth position of a virtual object with respect to the stereoscopic vision reference distance;

FIG. 31 is a diagram illustrating, as a comparative example, how the virtual objects are viewed through the screen of the upper LCD 22 when an identical stereoscopic vision reference distance is set for each of the virtual objects;

FIG. 32 is a diagram illustrating, as a comparative example, examples of positions of a virtual screen and various virtual objects in the virtual space when the virtual screen is disposed close to the point of origin of the marker coordinate system;

FIG. 33 is a diagram illustrating, as a comparative example, how the virtual objects are viewed through the screen of the upper LCD 22 when the virtual screen is disposed close to the point of origin of the marker coordinate system;

FIG. 34 is a diagram illustrating, as a comparative example, examples of positions of a virtual screen and virtual objects in a virtual space when a virtual object that is long in the depth direction is disposed in the virtual space;

FIG. 35 is a diagram illustrating, as a comparative example, how the virtual object are viewed through the screen of the upper LCD 22 when the virtual object disposed in the virtual space is long in the depth direction;

DESCRIPTION OF THE PREFERRED EMBODIMENTS (Structure of Game Apparatus)

Figure 1:
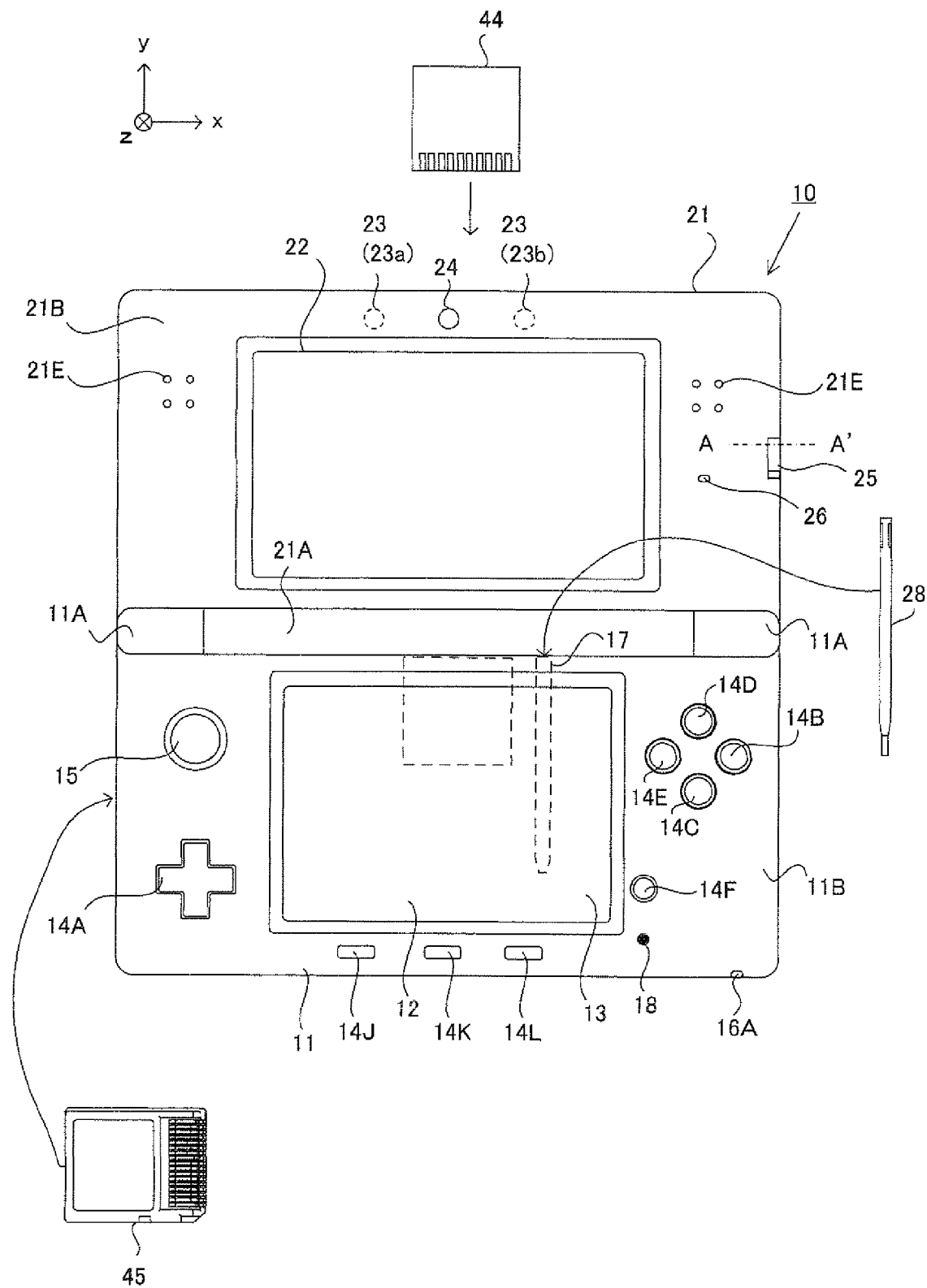
FIG. 1 is a front view of a game apparatus 10 in its opened state.
Figure 2:
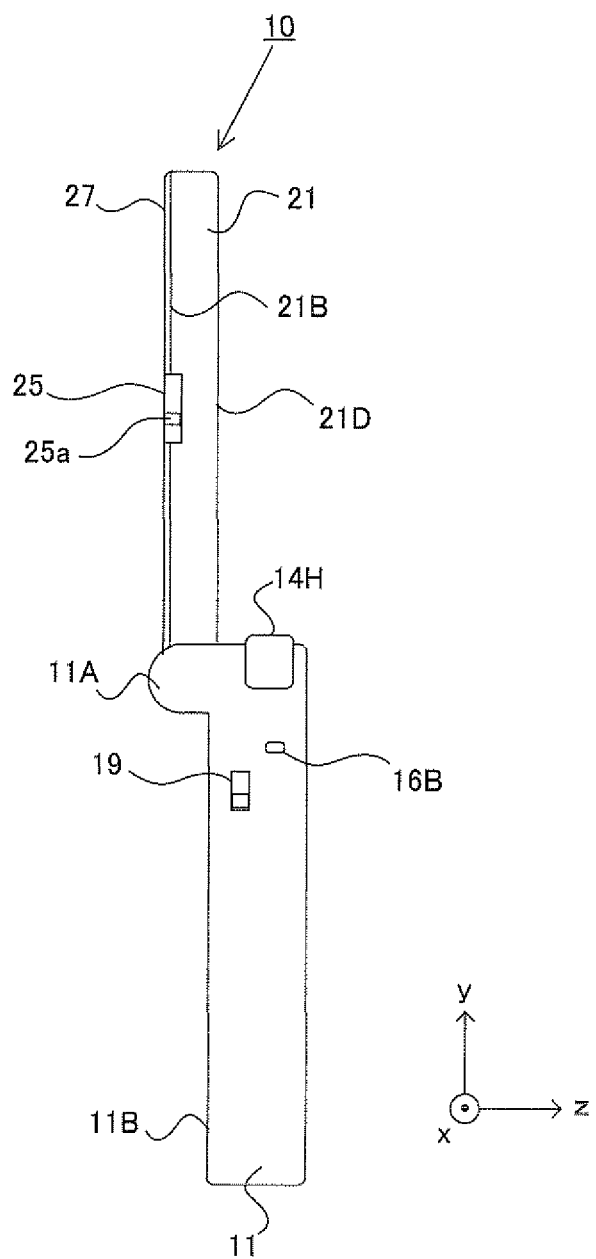
FIG. 2 is a side view of the game apparatus 10 in its opened state.
Figure 3:
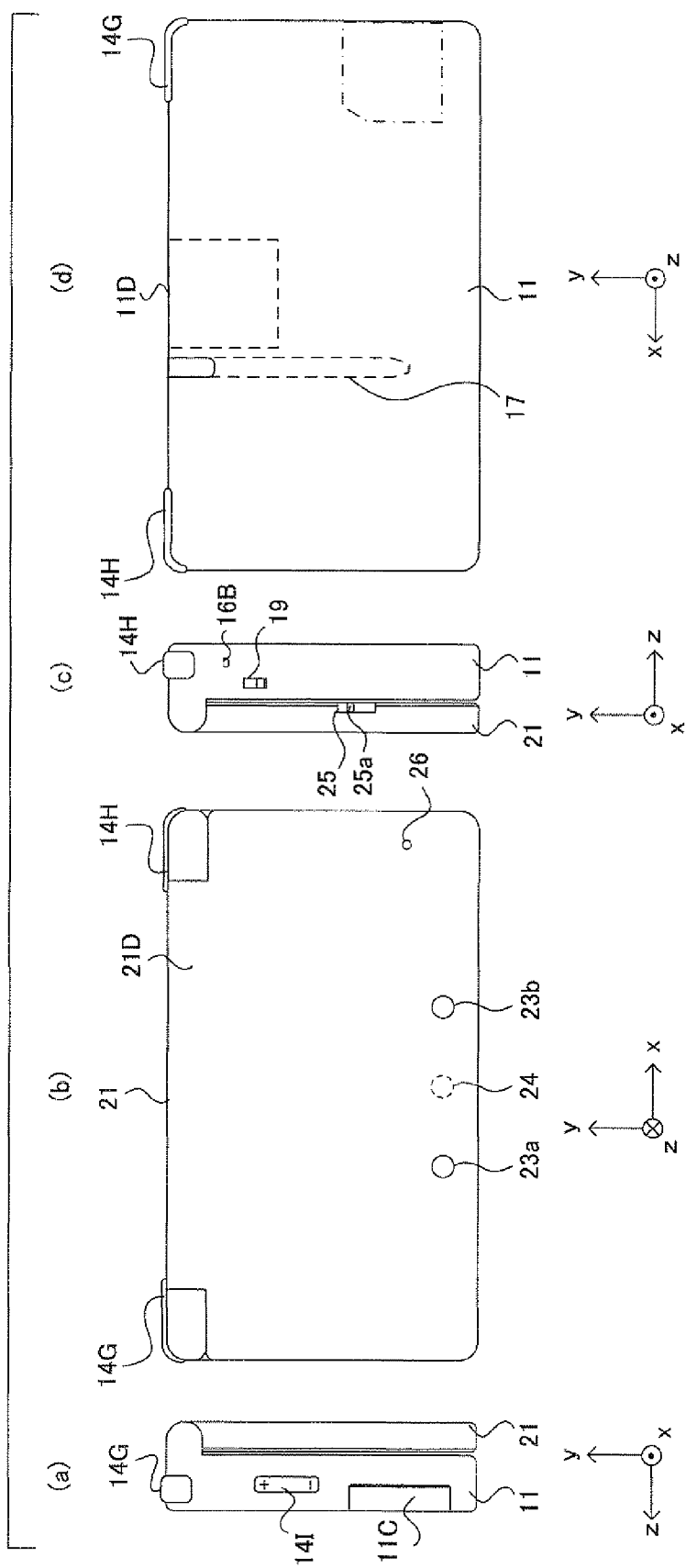
FIG. 3 is a left side view, a front view, a right side view, and a rear view of the game apparatus 10 in its closed state.

Hereinafter, a game apparatus according to one embodiment of the present invention will be described. FIG. 1 to FIG. 3 are each a plan view of an outer appearance of a game apparatus 10. The game apparatus 10 is a hand-held game apparatus, and is configured to be foldable as shown in FIG. 1 to FIG. 3. FIG. 1 and FIG. 2 show the game apparatus 10 in an opened state, and FIG. 3 shows the game apparatus 10 in a closed state. FIG. 1 is a front view of the game apparatus 10 in the opened state, and FIG. 2 is a right side view of the game apparatus 10 in the opened state. The game apparatus 10 is able to take an image by means of an imaging section, display the taken image on a screen, and store data of the taken image. The game apparatus 10 can execute a game program which is stored in an exchangeable memory card or a game program which is received from a server or another game apparatus, and can display, on the screen, an image generated by computer graphics processing, such as an image taken by a virtual camera set in a virtual space, for example.

Initially, an external structure of the game apparatus 10 will be described with reference to FIG. 1 to FIG. 3. The game apparatus 10 includes a lower housing 11 and an upper housing 21 as shown in FIG. 1 to FIG. 3. The lower housing 11 and the upper housing 21 are connected to each other so as to be operable and closable (foldable). In the present embodiment, the lower housing 11 and the upper housing 21 are each formed in a horizontally long plate-like rectangular shape, and are connected to each other at long side portions thereof so as to be pivotable with respect to each other.

As shown in FIG. 1 and FIG. 2, projections 11A each of which projects in a direction orthogonal to an inner side surface (main surface) 11B of the lower housing 11 are provided at the upper long side portion of the lower housing 11, whereas a projection 21A which projects from the lower side surface of the upper housing 21 in a direction orthogonal to the lower side surface of the upper housing 21 is provided at the lower long side portion of the upper housing 21. Since the projections 11A of the lower housing 11 and the projection 21A of the upper housing 21 are connected to each other, the lower housing 11 and the upper housing 21 are foldably connected to each other.

(Description of Lower Housing)

Initially, a structure of the lower housing 11 will be described. As shown in FIG. 1 to FIG. 3, in the lower housing 11, a lower LCD (Liquid Crystal Display) 12, a touch panel 13, operation buttons 14A to 14L (FIG. 1, FIG. 3), an analog stick 15, an LED 16A and an LED 16B, an insertion opening 17, and a microphone hole 18 are provided. Hereinafter, these components will be described in detail.

As shown in FIG. 1, the lower LCD 12 is accommodated in the lower housing 11. The lower LCD 12 has a horizontally long shape, and is located such that a long side direction thereof corresponds to a long side direction of the lower housing 11. The lower LCD 12 is positioned at the center of the lower housing 11. The lower LCD 12 is provided on the inner side surface (main surface) of the lower housing 11, and a screen of the lower LCD 12 is exposed at an opening of the lower housing 11. When the game apparatus 10 is not used, the game apparatus 10 is in the closed state, thereby preventing the screen of the lower LCD 12 from becoming unclean and damaged. The number of pixels of the lower LCD 12 may be, for example, 256 dots×192 dots (the longitudinal line×the vertical line). The lower LCD 12 is a display device for displaying an image in a planar manner (not in a stereoscopically visible manner), which is different from the upper LCD 22 as described below. Although an LCD is used as a display device in the present embodiment, any other display device such as a display device using an EL (Electro Luminescence) or the like may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the present embodiment, the touch panel 13 may be, but is not limited to, a resistive film type touch panel. A touch panel of any type such as electrostatic capacitance type may be used. In the present embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIG. 1 and FIG. 3(d)) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A is cross-shaped, and includes buttons for indicating an upward, a downward, a leftward, or a rightward direction. The button 14B, button 14C, button 14D, and button 14E are positioned so as to form a cross-shape. The button 14A to 14E, the selection button 14J, the HOME button 14K, and the start button 14L are assigned functions, respectively, in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction, and is provided to the left of the lower LCD 12 in an upper portion of the inner side surface of the lower housing 11. As shown in FIG. 1, the cross button 14A is provided to the left of the lower LCD 12 in the lower portion of the lower housing 11. That is, the analog stick 15 is provided above the cross button 14A. The analog stick 15 and the cross button 14A are positioned so as to be operated by a thumb of a left hand with which the lower housing is held. Further, the analog stick 15 is provided in the upper area, and thus the analog stick 15 is positioned such that a thumb of a left hand with which the lower housing 11 is held is naturally positioned on the position of the analog stick 15, and the cross button 14A is positioned such that the thumb of the left hand is positioned on the position of the cross button 14A when the thumb of the left hand is slightly moved downward from the analog stick 15. The analog stick 15 has a top, corresponding to a key, which slides parallel to the inner side surface of the lower housing 11. The analog stick 15 acts in accordance with a program executed by the game apparatus 10. For example, when a game in which a predetermined object appears in a three-dimensional virtual space is executed by the game apparatus 10, the analog stick 15 acts as an input device for moving the predetermined object in the three-dimensional virtual space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

Four buttons, that is, the button 14B, the button 14C, the button 14D, and the button 14E, which are positioned so as to form a cross shape, are positioned such that a thumb of a right hand with which the lower housing 11 is held is naturally positioned on the positions of the four buttons. Further, the four buttons and the analog stick 15 sandwich the lower LCD 12, so as to be bilaterally symmetrical in position with respect to each other. Thus, depending on a game program, for example, a left-handed person can make a direction instruction input by using these four buttons.

Further, the microphone hole 18 is provided on the inner side surface of the lower housing 11. Under the microphone hole 18, a microphone (see FIG. 6) is provided as a sound input device described below, and the microphone detects for a sound from the outside of the game apparatus 10.

FIG. 3(a) is a left side view of the game apparatus 10 in the closed state. FIG. 3(b) is a front view of the game apparatus 10 in the closed state. FIG. 3(c) is a right side view of the game apparatus 10 in the closed state. FIG. 3(d) is a rear view of the game apparatus 10 in the closed state. As shown in FIG. 3(b) and FIG. 3(d), an L button 14G and an R button 14H are provided on the upper side surface of the lower housing 11. The L button 14G is positioned on the left end portion of the upper side surface of the lower housing 11 and the R button 14H is positioned on the right end portion of the upper side surface of the lower housing 11. The L button 14G and the R button 14I1 can act, for example, as shutter buttons (imaging instruction buttons) of the imaging section. Further, as shown in FIG. 3(a), a sound volume button 14I is provided on the left side surface of the lower housing 11. The sound volume button 14I is used for adjusting a sound volume of a speaker of the game apparatus 10.

As shown in FIG. 3(a), a cover section 11C is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image taken by the game apparatus 10. The connector and the cover section 11C may be provided on the right side surface of the lower housing 11.

Further, as shown in FIG. 3(d), an insertion opening 11D through which an external memory 44 having a game program stored therein is inserted is provided on the upper side surface of the lower housing 11. A connector (not shown) for electrically connecting between the game apparatus 10 and the external memory 44 in a detachable manner is provided inside the insertion opening 11D. A predetermined game program is executed by connecting the external memory 44 to the game apparatus 10. The connector and the insertion opening 11D may be provided on another side surface (for example, the right side surface) of the lower housing 11.

Further, as shown in FIG. 1 and FIG. 3(c), a first LED 16A for notifying a user of an ON/OFF state of a power supply of the game apparatus 10 is provided on the lower side surface of the lower housing 11, and a second LED 16B for notifying a user of an establishment state of a wireless communication of the game apparatus 10 is provided on the right side surface of the lower housing 11. The game apparatus 10 can make wireless communication with other devices, and the second LED 16B is lit up when the wireless communication is established. The game apparatus 10 has a function of connecting to a wireless LAN in a method based on, for example, IEEE802.11.b/g standard. A wireless switch 19 for enabling/disabling the function of the wireless communication is provided on the right side surface of the lower housing 11 (see FIG. 3(c)).

A rechargeable battery (not shown) acting as a power supply for the game apparatus 10 is accommodated in the lower housing 11, and the battery can be charged through a terminal provided on a side surface (for example, the upper side surface) of the lower housing 11.

(Description of Upper Housing)

Next, a structure of the upper housing 21 will be described. As shown in FIG. 1 to FIG. 3, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided. Hereinafter, these components will be described in detail.

As shown in FIG. 1, the upper LCD 22 is accommodated in the upper housing 21. The upper LCD 22 has a horizontally long shape, and is located such that a long side direction thereof corresponds to a long side direction of the upper housing 21. The upper LCD 22 is positioned at the center of the upper housing 21. The area of a screen of the upper LCD 22 is set so as to be greater than the area of the screen of the lower LCD 12. Further, the screen of the upper LCD 22 is horizontally elongated as compared to the screen of the lower LCD 12. Specifically, a rate of the horizontal width in the aspect ratio of the screen of the upper LCD 22 is set so as to be greater than a rate of the horizontal width in the aspect ratio of the screen of the lower LCD 12.

The screen of the upper LCD 22 is provided on the inner side surface (main surface) 21B of the upper housing 21, and the screen of the upper LCD 22 is exposed at an opening of the upper housing 21. Further, as shown in FIG. 2, the inner side surface of the upper housing 21 is covered with a transparent screen cover 27. The screen cover 27 protects the screen of the upper LCD 22, and integrates the upper LCD 22 and the inner side surface of the upper housing 21 with each other, thereby achieving unity. The number of pixels of the upper LCD 22 may be, for example, 640 dots×200 dots (the horizontal line× the vertical line). Although, in the present embodiment, the upper LCD 22 is an LCD, a display device using an EL (Electro Luminescence), or the like may be used. In addition, a display device having any resolution may be used as the upper LCD 22.

The upper LCD 22 is a display device capable of displaying a stereoscopically visible image. Further, in the present embodiment, an image for a left eye and an image for a right eye are displayed by using substantially the same display area. Specifically, the upper LCD 22 may be a display device using a method in which the image for a left eye and the image for a right eye are alternately displayed in the horizontal direction in predetermined units (for example, every other line). Alternatively, a display device using a method in which the image for a left eye and the image for a right eye are alternately displayed in a time divisional manner may be used. Further, in the present embodiment, the upper LCD 22 is a display device capable of displaying an image which is stereoscopically visible with naked eyes. A lenticular lens type display device or a parallax barrier type display device is used which enables the image for a left eye and the image for a right eye, which are alternately displayed in the horizontal direction, to be separately viewed by the left eye and the right eye, respectively. In the present embodiment, the upper LCD 22 of a parallax barrier type is used. The upper LCD 22 displays, by using the image for a right eye and the image for a left eye, an image (a stereoscopic image) which is stereoscopically visible with naked eyes. That is, the upper LCD 22 allows a user to view the image for a left eye with her/his left eye, and the image for a right eye with her/his right eye by utilizing a parallax barrier, so that a stereoscopic image (a stereoscopically visible image) exerting a stereoscopic effect for a user can be displayed. Further, the upper LCD 22 may disable the parallax barrier. When the parallax barrier is disabled, an image can be displayed in a planar manner (it is possible to display a planar visible image which is different from a stereoscopically visible image as described above. Specifically, a display mode is used in which the same displayed image is viewed with a left eye and a right eye.). Thus, the upper LCD 22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch 25 described below.

Two imaging sections (23a and 23b) provided on the outer side surface (the back surface reverse of the main surface on which the upper LCD 22 is provided) 21D of the upper housing 21 are generically referred to as the outer imaging section 23. The imaging directions of the outer imaging section (left) 23a and the outer imaging section (right) 23b are each the same as the outward normal direction of the outer side surface 21D. Further, these imaging sections are each designed so as to be positioned in a direction which is opposite to the normal direction of the display surface (inner side surface) of the upper LCD 22 by 180 degrees. Specifically, the imaging direction of the outer imaging section (left) 23a and the imaging direction of the outer imaging section (right) 23b are parallel to each other. The outer imaging section (left) 23a and the outer imaging section (right) 23b can be used as a stereo camera depending on a program executed by the game apparatus 10. Further, depending on a program, when any one of the two outer imaging sections (23a and 23b) is used alone, the outer imaging section 23 may be used as a non-stereo camera. Further, depending on a program, images taken by the two outer imaging sections (23a and 23b) may be combined with each other or may compensate for each other, thereby enabling imaging using an extended imaging range. In the present embodiment, the outer imaging section 23 is structured so as to include two imaging sections, that is, the outer imaging section (left) 23a and the outer imaging section (right) 23b. Each of the outer imaging section (left) 23a and the outer imaging section (right) 23b includes an imaging device, such as a CCD image sensor or a CMOS image sensor, having a common predetermined resolution, and a lens. The lens may have a zooming mechanism.

As indicated by dashed lines in FIG. 1 and by solid lines in FIG. 3(b), the outer imaging section (left) 23a and the outer imaging section (right) 23b forming the outer imaging section 23 are aligned so as to be parallel to the horizontal direction of the screen of the upper LCD 22. Specifically, the outer imaging section (left) 23a and the outer imaging section (right) 23b are positioned such that a straight line connecting between the two imaging sections is parallel to the horizontal direction of the screen of the upper LCD 22. Reference numerals 23a and 23b which are indicated as dashed lines in FIG. 1 represent the outer imaging section (left) 23a and the outer imaging section (right) 23b, respectively, which are positioned on the outer side surface reverse of the inner side surface of the upper housing 21. As shown in FIG. 1, when a user views the screen of the upper LCD 22 from the front thereof, the outer imaging section (left) 23a is positioned to the left of the upper LCD 22 and the outer imaging section (right) 23b is positioned to the right of the upper LCD 22. When a program for causing the outer imaging section 23 to function as a stereo camera is executed, the outer imaging section (left) 23a takes an image for a left eye, which is viewed by a left eye of a user, and the outer imaging section (right) 23b takes an image for a right eye, which is viewed by a right eye of the user. A distance between the outer imaging section (left) 23a and the outer imaging section (right) 23b is set so as to be approximately the same as a distance between both eyes of a person, that is, may be set so as to be within a range from 30 mm to 70 mm, for example. However, the distance between the outer imaging section (left) 23a and the outer imaging section (right) 23b is not limited to a distance within the range described above.

In the present embodiment, the outer imaging section (left) 23a and the outer imaging section (right) 23b are secured to the housing, and the imaging directions thereof cannot be changed.

Further, the outer imaging section (left) 23a and the outer imaging section (right) 23b are positioned to the left and to the right, respectively, of the upper LCD 22 (on the left side and the right side, respectively, of the upper housing 21) so as to be horizontally symmetrical with respect to the center of the upper LCD 22. Specifically, the outer imaging section (left)

23a and the outer imaging section (right) 23b are positioned so as to be symmetrical with respect to a line which divides the upper LCD 22 into two equal parts, that is, the left part and the right part. Further, the outer imaging section (left) 23a and the outer imaging section (right) 23b are positioned at positions which are reverse of positions above the upper edge of the screen of the upper LCD 22 and which are on the upper portion of the upper housing 21 in an opened state. Specifically, when the upper LCD 22 is projected on the outer side surface of the upper housing 21, the outer imaging section (left) 23a and the outer imaging section (right) 23b are positioned, on the outer side surface of the upper housing 21, at a position above the upper edge of the screen of the upper LCD 22 having been projected.

As described above, the two imaging sections (23a and 23b) of the outer imaging section 23 are positioned to the left and the right of the upper LCD 22 so as to be horizontally symmetrical with respect to the center of the upper LCD 22. Therefore, when a user views the upper LCD 22 from the front thereof, the imaging direction of the outer imaging section 23 can be the same as the direction of the line of sight of the user. Further, the outer imaging section 23 is positioned at a position reverse of a position above the upper edge of the screen of the upper LCD 22. Therefore, the outer imaging section 23 and the upper LCD 22 do not interfere with each other inside the upper housing 21. Therefore, the upper housing 21 may have a reduced thickness as compared to a case where the outer imaging section 23 is positioned on a position reverse of a position of the screen of the upper LCD 22.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

As shown in FIG. 1, when the upper housing 21 is in the opened state, the inner imaging section 24 is positioned, on the upper portion of the upper housing 21, above the upper edge of the screen of the upper LCD 22. Further, in this state, the inner imaging section 24 is positioned at the horizontal center of the upper housing 21 (on a line which separates the upper housing 21 (the screen of the upper LCD 22) into two equal parts, that is, the left part and the right part). Specifically, as shown in FIG. 1 and FIG. 3(b), the inner imaging section 24 is positioned on the inner side surface of the upper housing 21 at a position reverse of the middle position between the left and the right imaging sections (the outer imaging section (left) 23a and the outer imaging section (right) 23b) of the outer imaging section 23. Specifically, when the left and the right imaging sections of the outer imaging section 23 provided on the outer side surface of the upper housing 21 are projected on the inner side surface of the upper housing 21, the inner imaging section 24 is positioned at the middle position between the left and the right imaging sections having been projected. The dashed line 24 indicated in FIG. 3(b) represents the inner imaging section 24 positioned on the inner side surface of the upper housing 21.

As described above, the inner imaging section 24 is used for taking an image in the direction opposite to that of the outer imaging section 23. The inner imaging section 24 is positioned on the inner side surface of the upper housing 21 at a position reverse of the middle position between the left and the right imaging sections of the outer imaging section 23. Thus, when a user views the upper LCD 22 from the front thereof, the inner imaging section 24 can take an image of a face of the user from the front thereof. Further, the left and the right imaging sections of the outer imaging section 23 do not interfere with the inner imaging section 24 inside the upper housing 21, thereby enabling reduction of the thickness of the upper housing 21.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22. As shown in FIG. 1 to FIG. 3, the 3D adjustment switch 25 is provided at the end portions of the inner side surface and the right side surface of the upper housing 21, and is positioned at a position at which the 3D adjustment switch 25 is visible to a user when the user views the upper LCD 22 from the front thereof. Further, an operation section of the 3D adjustment switch 25 projects on the inner side surface and the right side surface, and can be viewed and operated from both sides. All the switches other than the 3D adjustment switch 25 are provided on the lower housing 11.

FIG. 4 is a cross-sectional view of the upper housing 21 shown in FIG. 1 taken along a line A-A'. As shown in FIG. 4, a recessed portion 21C is formed at the right end portion of the inner side surface of the upper housing 21, and the 3D adjustment switch 25 is provided in the recessed portion 21C. The 3D adjustment switch 25 is provided so as to be visible from the front surface and the right side surface of the upper housing 21 as shown in FIG. 1 and FIG. 2. A slider 25a of the 3D adjustment switch 25 is slidable to any position in a predetermined direction (along the longitudinal direction of the right side surface), and a display mode of the upper LCD 22 is determined in accordance with the position of the slider 25a.

FIG. 5A to FIG. 5C are each a diagram illustrating a state in which the slider 25a of the 3D adjustment switch 25 slides. FIG. 5A is a diagram illustrating a state in which the slider 25a of the 3D adjustment switch 25 is positioned at the lowermost position (a third position). FIG. 5B is a diagram illustrating a state in which the slider 25a of the 3D adjustment switch 25 is positioned above the lowermost position (a first position). FIG. 5C is a diagram illustrating a state in which the slider 25a of the 3D adjustment switch 25 is positioned at the uppermost position (a second position).

As shown in FIG. 5A, when the slider 25a of the 3D adjustment switch 25 is positioned at the lowermost position (the third position), the upper LCD 22 is set to the planar display mode, and a planar image is displayed on the screen of the upper LCD 22 (the upper LCD 22 may remain set to the stereoscopic display mode, and the same image may be used for the image for a left eye and the image for a right eye, to perform planar display). On the other hand, when the slider 25a is positioned between a position shown in FIG. 5B (a position (first position) above the lowermost position) and a position shown in FIG. 5C (the uppermost position (the second position)), the upper LCD 22 is set to the stereoscopic display mode. In this case, a stereoscopically visible image is displayed on the screen of the upper LCD 22. When the slider 25a is positioned between the first position and the second position, a manner in which the stereoscopic image is visible is adjusted in accordance with the position of the slider 25a. Specifically, an amount of deviation in the horizontal direction between a position of an image for a right eye and a position of an image for a left eye is adjusted in accordance with the position of the slider 25a. The slider 25a of the 3D adjustment switch 25 is configured so as to be fixed at the third position, and is slidable, along the longitudinal direction of the right side surface, to any position between the first position and the second position. For example, the slider 25a is fixed at the third position by a projection (not shown) which projects, from the side surface of the 3D adjustment switch 25, in the lateral direction shown in FIG. 5A, and does not slide upward from the third position unless a predetermined force or a force greater than the predetermined force is applied upward. When the slider 25a is positioned between the third position and the first position, the manner in which the stereoscopic image is visible is not adjusted, which is intended as a margin. In another embodiment, the third position and the first position may be the same position, and, in this case, no margin is provided. Further, the third position may be provided between the first position and the second position. In this case, a direction in which an amount of deviation in the horizontal direction between a position of an image for a right eye and a position of an image for a left eye is adjusted when the slider is moved from the third position toward the first position, is opposite to a direction in which an amount of deviation in the horizontal direction between the position of the image for the right eye and the position of the image for the left eye is adjusted when the slider is moved from the third position toward the second position.

The 3D indicator 26 indicates whether or not the upper LCD 22 is in the stereoscopic display mode. The 3D indicator 26 is implemented as a LED, and is lit up when the stereoscopic display mode of the upper LCD 22 is enabled. The 3D indicator 26 may be lit up only when the program processing for displaying a stereoscopically visible image is performed (namely, image processing in which an image for a left eye is different from an image for a right eye is performed in the case of the 3D adjustment switch being positioned between the first position and the second position) in a state where the upper LCD 22 is in the stereoscopic display mode. As shown in FIG. 1, the 3D indicator 26 is positioned near the screen of the upper LCD 22 on the inner side surface of the upper housing 21. Therefore, when a user views the screen of the upper LCD 22 from the front thereof, the user can easily view the 3D indicator 26. Therefore, also when a user is viewing the screen of the upper LCD 22, the user can easily recognize the display mode of the upper LCD 22.

Further, a speaker hole 21E is provided on the inner side surface of the upper housing 21. A sound is outputted through the speaker hole 21E from a speaker 43 descried below.

(Internal Configuration of Game Apparatus 10)

Figure 6:
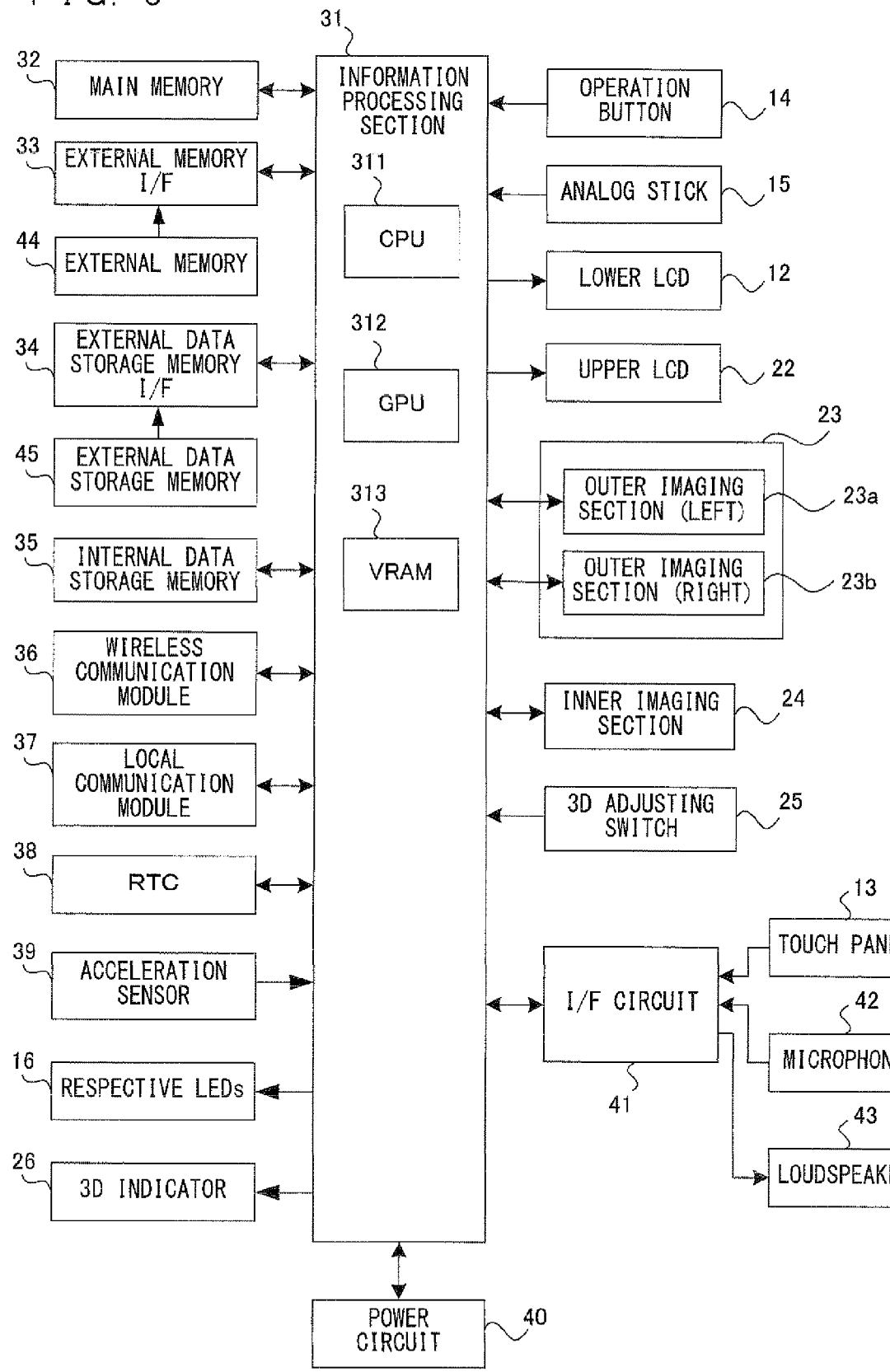
FIG. 6 is a block diagram illustrating an internal configuration of the game apparatus 10.

Next, an internal electrical configuration of the game apparatus 10 will be described with reference to FIG. 6. FIG. 6 is a block diagram illustrating an internal configuration of the game apparatus 10. As shown in FIG. 6, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, a power supply circuit 40, an interface circuit (I/F circuit) 41, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. By executing a program stored in a memory (for example, the external memory 44 or the internal data storage memory 35 connected to the external memory I/F 33) inside the game apparatus 10, the information processing section 31 of the CPU 311 executes processes in accordance with the program (for example, an imaging process, and an image display process described later). The program executed by the CPU 311 of the information processing section 31 may be acquired from another device through communication with the other device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the processes based on the above described program, and temporarily stores a program acquired from an external source (the external memory 44, other apparatuses, and the like). In the present embodiment, for example, a PSRAM (Pseudo-SRAM) is used as the main memory 32.

The external memory 44 is nonvolatile storage means for storing a program executed by the information processing section 31. The external memory 44 is implemented as, for example, a read-only semiconductor memory. When the external memory 44 is connected to the external memory I/F 33, the information processing section 31 can load a program stored in the external memory 44. A predetermined process is performed by the program loaded by the information processing section 31 being executed. The external data storage memory 45 is implemented as a non-volatile readable and writable memory (for example, a NAND flash memory), and is used for storing predetermined data. For example, images taken by the outer imaging section 23 and/or images taken by another device are stored in the external data storage memory 45. When the external data storage memory 45 is connected to the external data storage memory I/F 34, the information processing section 31 loads an image stored in the external data storage memory 45, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through the wireless communication module 36 by wireless communication are stored in the internal data storage memory 35.

The wireless communication module 36 has a function of connecting to a wireless LAN by using a method based on, for example, IEEE 802.11.b/g standard. The local communication module 37 has a function of performing wireless communication with the same type of game apparatus in a predetermined communication method (for example, infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from the same type of another game apparatus by using the local communication module 37.

The acceleration sensor 39 is connected to the information processing section 31. The acceleration sensor 39 detects magnitudes of accelerations (linear accelerations) in the directions of the straight lines along the three axial (xyz axial) directions, respectively. The acceleration sensor 39 is provided inside the lower housing 11. In the acceleration sensor 39, as shown in FIG. 1, the long side direction of the lower housing 11 is defined as x axial direction, the short side direction of the lower housing 11 is defined as y axial direction, and the direction orthogonal to the inner side surface (main surface) of the lower housing 11 is defined as z axial direction, thereby detecting magnitudes of the linear accelerations for the respective axes. The acceleration sensor 39 is, for example, an electrostatic capacitance type acceleration sensor. However, another type of acceleration sensor may be used. The acceleration sensor 39 may be an acceleration sensor for detecting a magnitude of an acceleration for one axial direction or two-axial directions. The information processing section 31 can receive data (acceleration data) representing accelerations detected by the acceleration sensor 39, and detect an orientation and a motion of the game apparatus 10.

The RTC 38 and the power supply circuit 40 are connected to the information processing section 31. The RTC 38 counts time, and outputs the time to the information processing section 31. The information processing section 31 calculates a current time (date) based on the time counted by the RTC 38. The power supply circuit 40 controls power from the power supply (the rechargeable battery accommodated in the lower housing 11 as described above) of the game apparatus 10, and supplies power to each component of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier which is not shown. The microphone 42 detects a voice from a user, and outputs a sound signal to the I/F circuit 41. The amplifier amplifies a sound signal outputted from the I/F circuit 41, and a sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The touch position data represents a coordinate of a position, on an input surface of the touch panel 13, on which an input is made. The touch panel control circuit reads a signal outputted from the touch panel 13, and generates the touch position data every predetermined time. The information processing section 31 acquires the touch position data, to recognize a position on which an input is made on the touch panel 13.

The operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14I has been pressed. The information processing section 31 acquires the operation data from the operation button 14 to perform a process in accordance with the input on the operation button 14.

The lower LCD 12 and the upper LCD 22 are connected to the information processing section 31. The lower LCD 12 and the upper LCD 22 each display an image in accordance with an instruction from (the GPU 312 of) the information processing section 31. In the present embodiment, the information processing section 31 causes the upper LCD 22 to display a stereoscopic image (an image that is stereoscopically visible).

Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for a right eye and an image for a left eye, which are stored in the VRAM 313 of the information processing section 31 are outputted to the upper LCD 22. More specifically, the LCD controller alternately repeats reading of pixel data of the image for a right eye for one line in the vertical direction, and reading of pixel data of the image for a left eye for one line in the vertical direction, thereby reading, from the VRAM 313, the image for a right eye and the image for a left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD 22. A user views the images through the parallax barrier in the upper LCD 22, so that the image for the right eye is viewed by the user's right eye, and the image for the left eye is viewed by the user's left eye. Thus, the stereoscopically visible image is displayed on the screen of the upper LCD 22.

The outer imaging section 23 and the inner imaging section 24 are connected to the information processing section 31. The outer imaging section 23 and the inner imaging section 24 each take an image in accordance with an instruction from the information processing section 31, and output data of the taken image to the information processing section 31.

The 3D adjustment switch 25 is connected to the information processing section 31. The 3D adjustment switch 25 transmits, to the information processing section 31, an electrical signal in accordance with the position of the slider 25a.

The 3D indicator 26 is connected to the information processing section 31. The information processing section 31 controls whether or not the 3D indicator 26 is to be lit up. For example, the information processing section 31 lights up the 3D indicator 26 when the upper LCD 22 is in the stereoscopic display mode. The game apparatus 10 has the internal configuration as described above.

(General Outline of an Operation of the Game Apparatus 10)

A general outline of the operation of the game apparatus 10 according to the present embodiment will be described in the following. In the present embodiment, displayed on the screen of the upper LCD 22 in a stereoscopically visible manner based on an image display program is a combined image obtained by combining an image of a real world that is currently imaged by the outer imaging section 23 (the outer imaging section (left) 23a and the outer imaging section (right) 23b), and an image of virtual objects existing in a three dimension virtual space.

Figure 7:
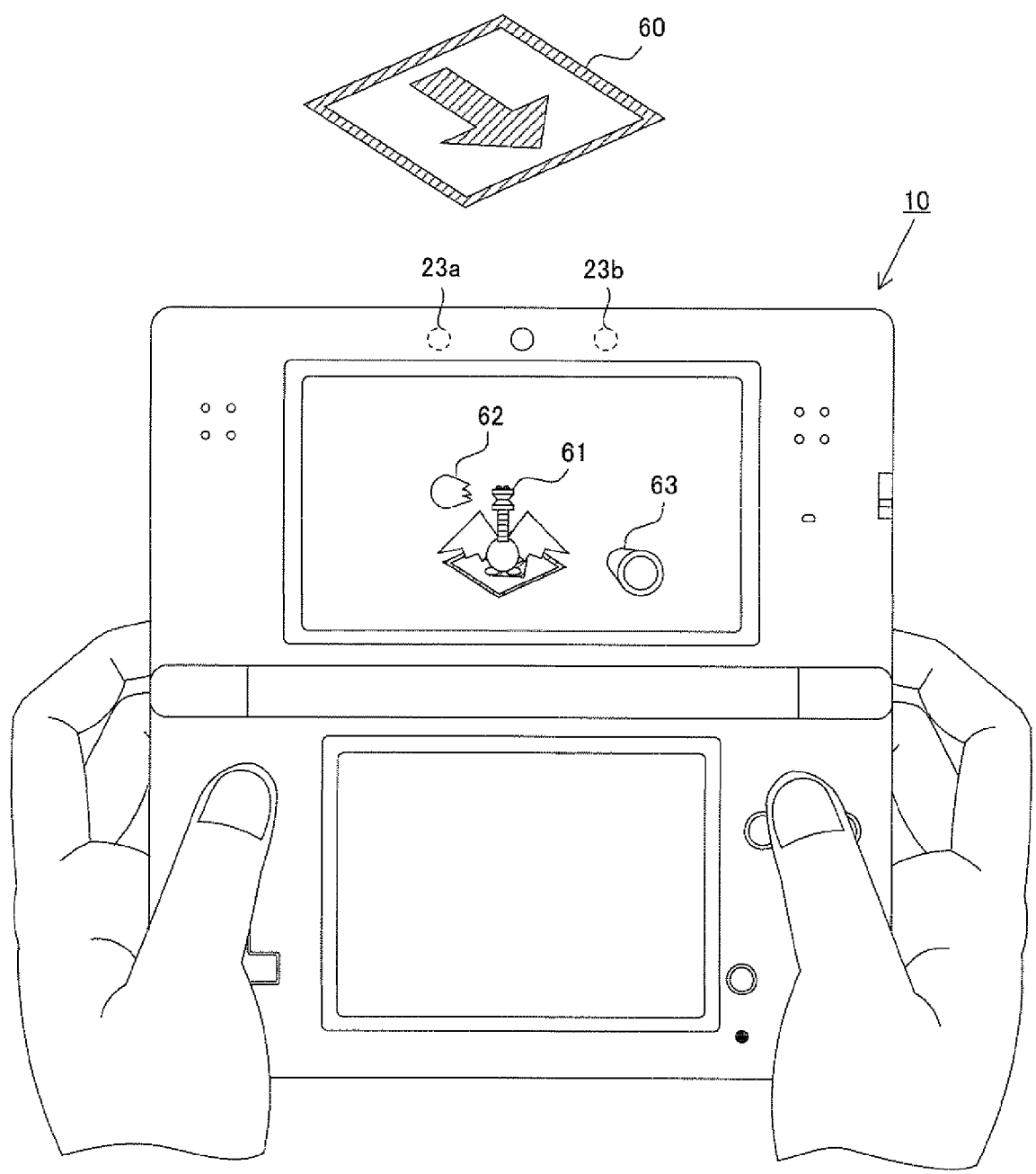
FIG. 7 is a diagram illustrating one example of a stereoscopic image displayed on a screen of an upper LCD 22.

FIG. 7 shows one example of a stereoscopic image displayed on the screen of the upper LCD 22 when a marker 60 is being imaged by the outer imaging section 23. A square with an arrow is drawn on the marker 60, and the CPU 311 can determine whether or not the marker is included in the image by performing an image processing such as, for example, pattern matching on the image (real world image) acquired by the outer imaging section 23. When the marker 60 is imaged by the outer imaging section 23, a virtual object 61 representing a dragon (in the following, referred to as a dragon object) on the marker 60 is displayed on the upper LCD 22 in a stereoscopically visible manner. Other than the dragon object 61, a virtual object 62 representing flames spitted by the dragon (in the following, referred also as a flame object), a virtual object 63 representing a bullet (in the following, referred also as a bullet object) discharged in response to an instruction by the user to discharge (for example, by holding down the L button 14G or the R button 14H), and the like are displayed on the upper LCD 22 in a stereoscopically visible manner.

It should be noted that, when the position and direction of the marker 60 displayed on the screen of the upper LCD 22 changes as the user moves the game apparatus 10, as a response to that, the positions and the directions of the virtual objects 61 to 63 will be changed. Therefore, the virtual objects 61 to 63 will appear to the user as if they truly exist in the real world.

In the following, with reference to FIG. 8 to FIG. 33, details of the image display process executed by the game apparatus 10 based on the image display program will be described.

(Memory Map)

First, main data that are stored in the main memory 32 while the image display program is being executed will be described. FIG. 8 is a diagram illustrating a memory map of the main memory 32 in the game apparatus 10. As shown in FIG. 8, an image display program 70, a left real world image 71L, a right real world image 71R, a left view matrix 72L, a right view matrix 72R, virtual object information 73, various variables 74, and the like are stored in the main memory 32.

The image display program 70 is a program that causes the CPU 311 to execute the above described image display process.

The left real world image 71L is an image taken by the outer imaging section (left) 23a.

The right real world image 71R is an image taken by the outer imaging section (right) 23b.

The left view matrix 72L is a matrix used when rendering a virtual object viewed from a left virtual camera, and is a coordinate transformation matrix for transforming coordinates represented by a marker coordinate system into coordinates represented by a left virtual camera coordinate system.

The right view matrix 72R is a matrix used when rendering a virtual object viewed from a right virtual camera, and is a coordinate transformation matrix for transforming coordinates represented by the marker coordinate system into coordinates represented by a right virtual camera coordinate system.

The virtual object information 73 is information related to virtual objects, and includes model information representing shapes and patterns of the virtual objects, current positions of the virtual objects in the virtual space, and the like.

The various variables 74 are variables used when the image display program 70 is executed, and includes an offset Os described later.

When the power of the game apparatus 10 is turned on, the information processing section 31 (the CPU 311) of the game apparatus 10 executes a start-up program stored in a ROM, which is not shown, and thereby respective units of the main memory 32 are initialized. Next, the image display program stored in internal data storage memory 35 is loaded to the main memory 32, and execution of the image display program is started by the CPU 311 of the information processing section 31.

With reference to the flowcharts in FIG. 9 to FIG. 12, flows of the processes executed based on the image display program will be described in the following. It should be noted that, the flowcharts in FIG. 9 to FIG. 12 are merely examples. Therefore, respective steps in the processing sequence may be shuffled if a similar result can be obtained. In addition, values of variables and thresholds used in a determination step are merely examples, and other values may be adopted if necessary. Furthermore, in the present embodiment, descriptions are provided under an assumption that all the processes in the steps in the flowcharts of FIG. 9 to FIG. 12 are to be executed by the CPU 311; however, processes of one part of the steps in the flowcharts of FIG. 9 to FIG. 12 may be executed by a dedicated circuit or a processor other than the CPU 311.

(Main Process)

Figure 9:
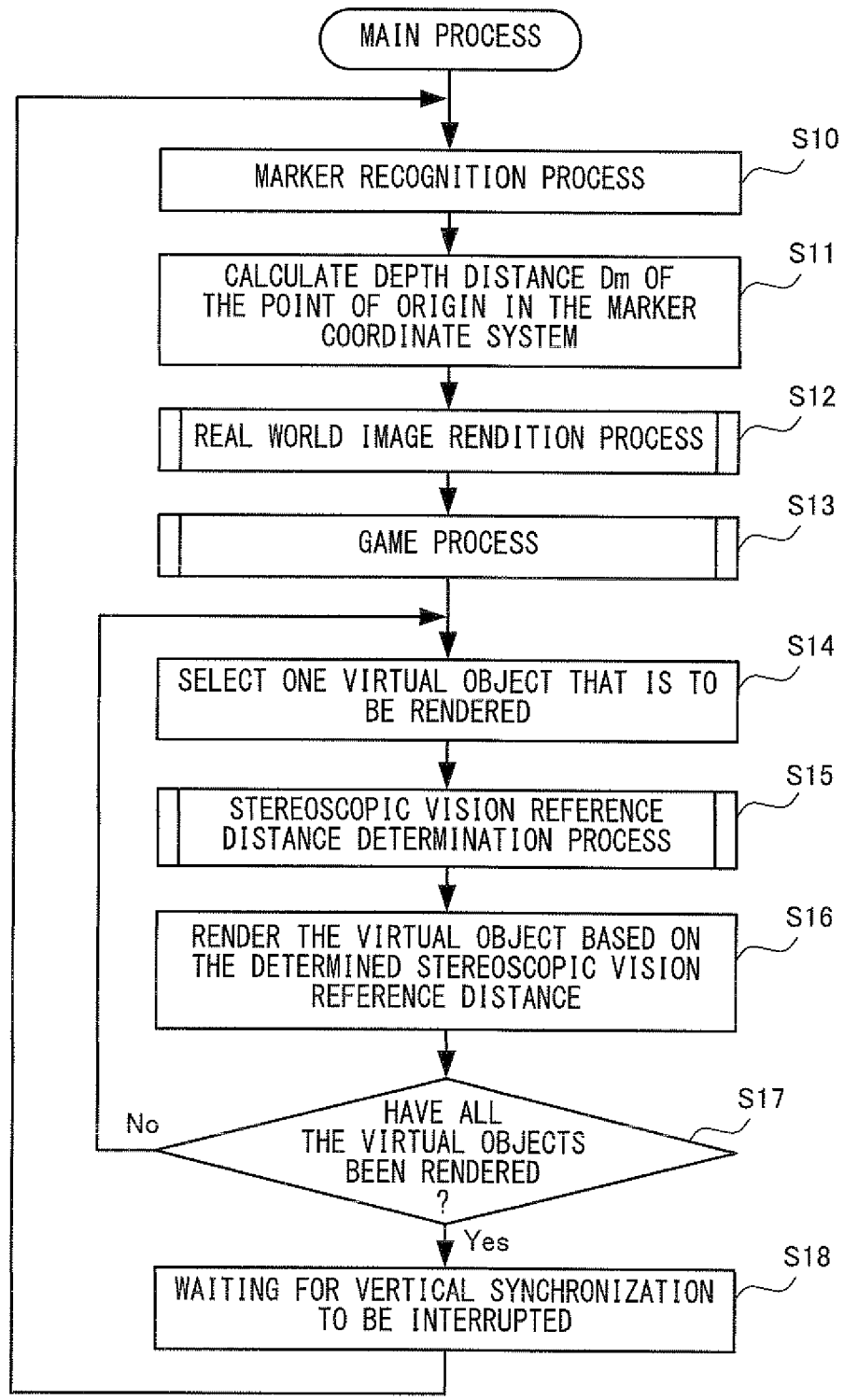
FIG. 9 is a flowchart showing a flow of a main process.

FIG. 9 is a flowchart showing a flow of the main process that is executed by the CPU 311 based on the image display program 70. Details of the main process will be described in the following.

At step S10 in FIG. 9, the CPU 311 performs a marker recognition process. A general outline of the marker recognition process will be described in the following.

Figure 13:
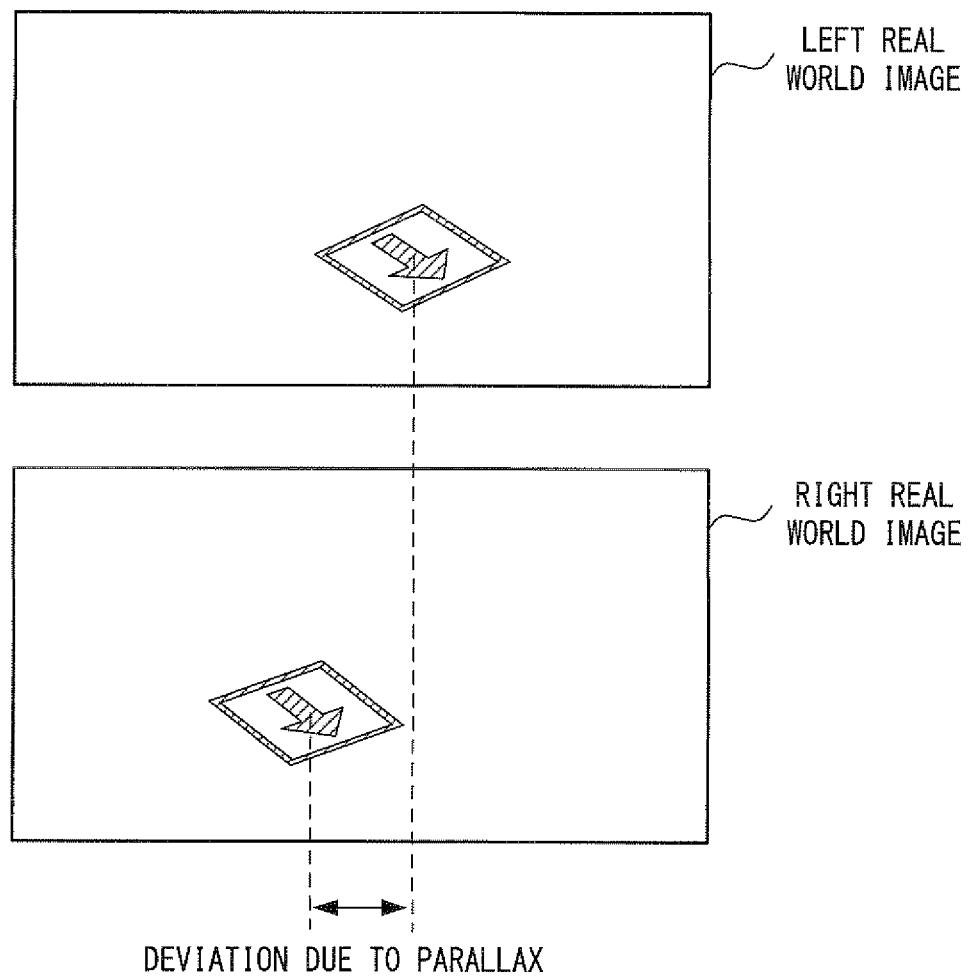
FIG. 13 is a diagram illustrating examples of a left real world image and a right real world image.

As described above, in the upper housing 21, the outer imaging section (left) 23a and the outer imaging section (right) 23b are separated by a certain interval (for example, 3.5 cm). Therefore, when the marker 60 is imaged simultaneously by the outer imaging section (left) 23a and the outer imaging section (right) 23b, as shown in FIG. 13, due to parallax, a position and attitude of the marker 60 in the left real world image taken by the outer imaging section (left) 23a respectively deviate from a position and attitude of the marker 60 in the right real world image taken by the outer imaging section (right) 23b. The CPU 311 performs the marker recognition process on at least one of the left real world image and the right real world image.

Figure 14:
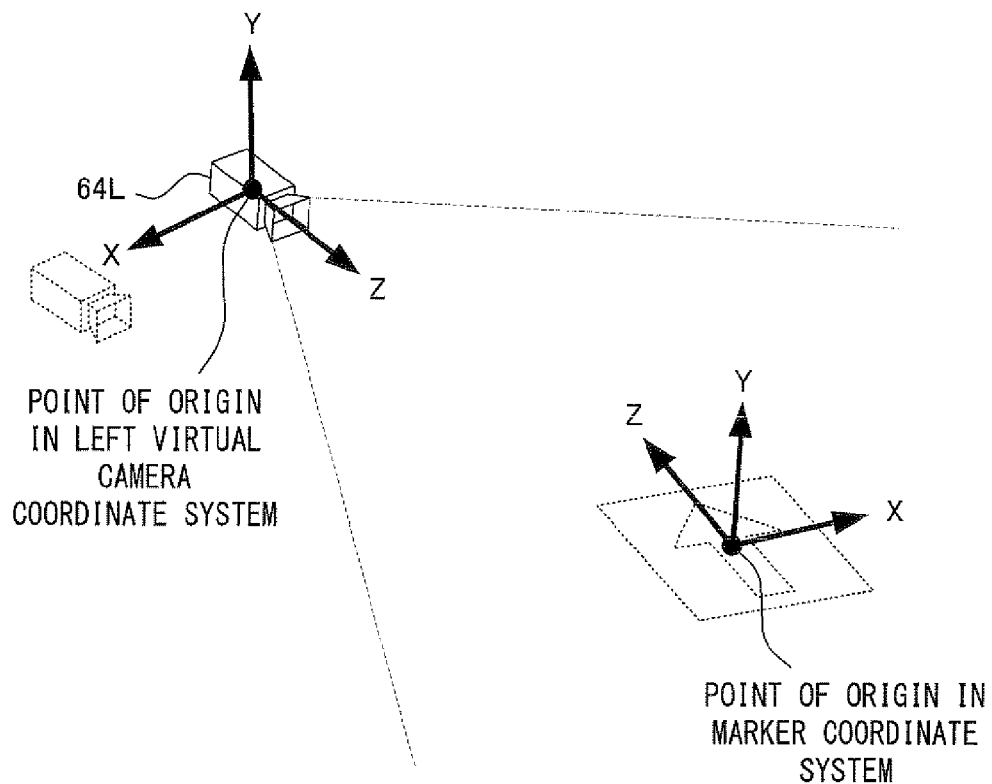
FIG. 14 is a diagram illustrating a position and an attitude of a left virtual camera 64L, which are calculated in accordance with a result of a marker recognition process.

For example, when the marker recognition process is performed on the left real world image, the CPU 311 determines, by a pattern-matching method or the like, whether or not the marker 60 is included in the left real world image; and when the marker 60 is included in the left real world image, the CPU 311 calculates the left view matrix 72L based on the position and attitude of the marker 60 in the left real world image. It should be noted that, the left view matrix 72L is a matrix that represents a position and attitude of the left virtual camera, which are calculated based on the position and attitude of the marker 60 in the left real world image. More precisely, as shown in FIG. 14, the left view matrix 72L is a coordinate transformation matrix for transforming coordinates represented by the marker coordinate system in the virtual space (a coordinate system whose a point of origin is a predetermined point that is in the virtual space and that corresponds to a position of the marker 60 in the real world) into coordinates represented by the left virtual camera coordinate system defined by using, as references, the position and attitude of a left virtual camera 64L (a virtual camera in the virtual space corresponding to the outer imaging section (left) 23a in the real world), which are calculated based on the position and attitude of the marker 60 in the left real world image.

Figure 15:
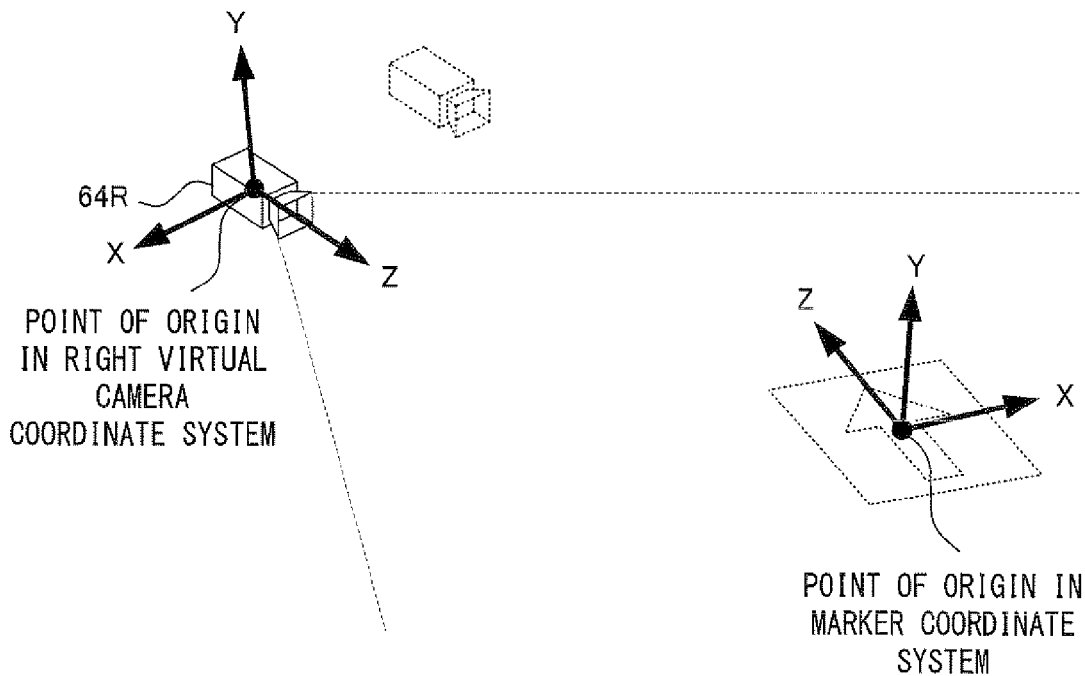
FIG. 15 is a diagram illustrating a position and an attitude of a right virtual camera 64R, which are calculated in accordance with the result of the marker recognition process.

In addition, for example, when the marker recognition process is performed on the right real world image, the CPU 311 determines, by a pattern-matching method or the like, whether or not the marker 60 is included in the right real world image; and when the marker 60 is included in the right real world image, the CPU 311 calculates the right view matrix 72R based on the position and attitude of the marker 60 in the right real world image. It should be noted that, the right view matrix 72R is a matrix that represents a position and attitude of the right virtual camera, which are calculated based on the position and attitude of the marker 60 in the right real world image. More precisely, as shown in FIG. 15, the right view matrix 72R is a coordinate transformation matrix for transforming coordinates represented by the marker coordinate system in the virtual space (a coordinate system whose point of origin is a predetermined point that is in the virtual space and that corresponds to a position of the marker 60 in the real world) into coordinates represented by the right virtual camera coordinate system defined by using, as references, the position and attitude of a right virtual camera 64R (a virtual camera in the virtual space corresponding to the outer imaging section (right) 23b in the real world), which are calculated based on the position and attitude of the marker 60 in the right real world image.

Figure 16:
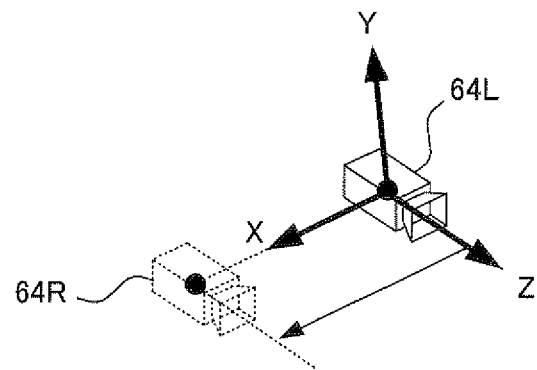
FIG. 16 is a diagram illustrating the position of the right virtual camera 64R, which is determined based on the position and attitude of the left virtual camera 64L.

If it is assumed that recognizing a marker is performed with high precision and is completely free of errors and that attaching the outer imaging section (left) 23a and the outer imaging section (right) 23b to the game apparatus 10 is performed with high precision and is completely free of errors; the position of the right virtual camera 64R calculated by a marker recognition result from the right real world image can be obtained by shifting, in an X-axis direction of the left virtual camera coordinate system for a certain distance, the position of the left virtual camera 64L calculated by the marker recognition result of the left real world image; and the attitude of the right virtual camera 64R calculated from the marker recognition result of the right real world image is identical to the attitude of the left virtual camera 64L calculated from the marker recognition result of the left real world image (thus, the X-axis, Y-axis, and Z-axis in the left virtual camera coordinate system are respectively parallel to the X-axis, Y-axis, and Z-axis of the right virtual camera coordinate system). However, in reality, precisely recognizing a marker and precisely attaching the outer imaging section (left) 23a and the outer imaging section (right) 23b to the game apparatus 10 without errors cannot be achieved. Therefore, an ideal relationship cannot be obtained for the position and attitude of the left virtual camera 64L, which are calculated from the marker recognition result of the left real world image, and the position and attitude of the right virtual camera 64R, which are calculated from the marker recognition result of the right real world image (for example, the left virtual camera 64L and the right virtual camera 64R become too close to or separated from each other, and the attitude of the left virtual camera 64L and the attitude of the right virtual camera 64R become different from each other). Thus, there may be cases where the virtual objects cannot be stereoscopically viewed normally if the calculated positions and attitudes of the left virtual camera 64L and the right virtual camera 64R are used, without any changes, to stereoscopically displayed the virtual objects on the upper LCD 22. Therefore, in the present embodiment, as one example, as shown in FIG. 16, the position and attitude of the right virtual camera 64R are determined based on the position and attitude of the left virtual camera 64L calculated from the marker recognition result of the left real world image.

Figure 17:
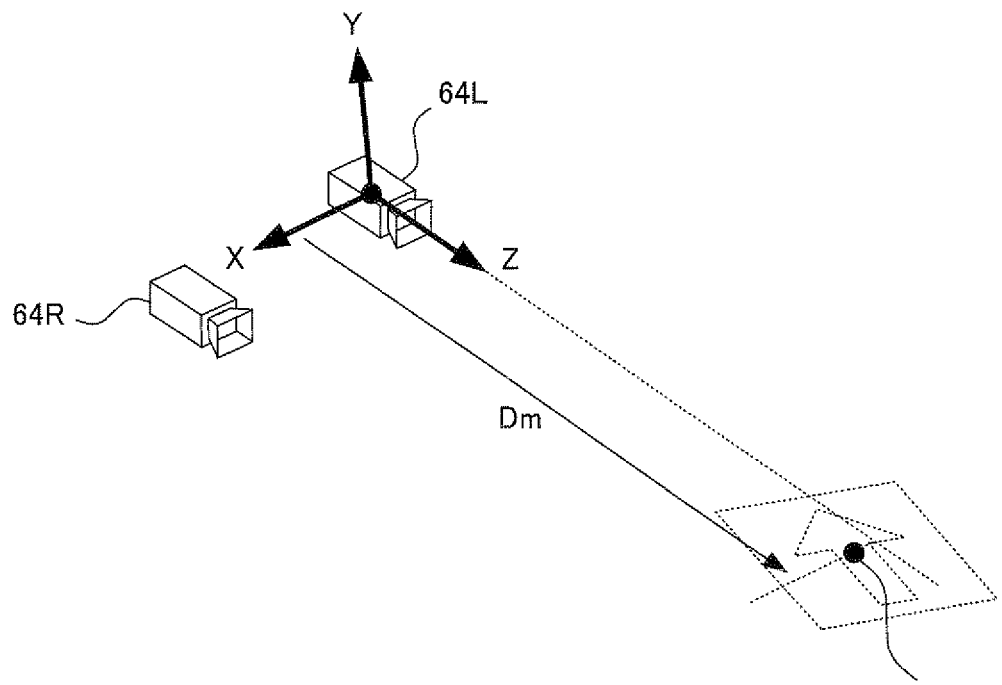
FIG. 17 is a diagram illustrating a depth distance Dm of a point of origin in a marker coordinate system viewed from the left virtual camera 64L.

At step S11, the CPU 311 calculates a depth distance Dm of the point of origin of the marker coordinate system in the virtual space. In this specification, a "depth distance" means a depth (a distance in an imaging direction) viewed from a virtual camera (the left virtual camera 64L, the right virtual camera 64R, or a midpoint of the two). The same applies to a camera in the real world, and a depth (a distance in an imaging direction) viewed from a camera is referred to as a depth distance. For example, as shown in FIG. 17, a Z-axis value of coordinates obtained by multiplying (0, 0, 0) to the left view matrix 72L (thus, coordinates of a point of origin in the marker coordinate system represented in the left virtual camera coordinate system) is determined as the depth distance Dm of the point of origin of the marker coordinate system.

At step S12, the CPU 311 performs a real world image rendition process. Details of the real world image rendition process will be described in the following with reference to the flowchart in FIG. 10.

(Real World Image Rendition Process)

Figure 10:
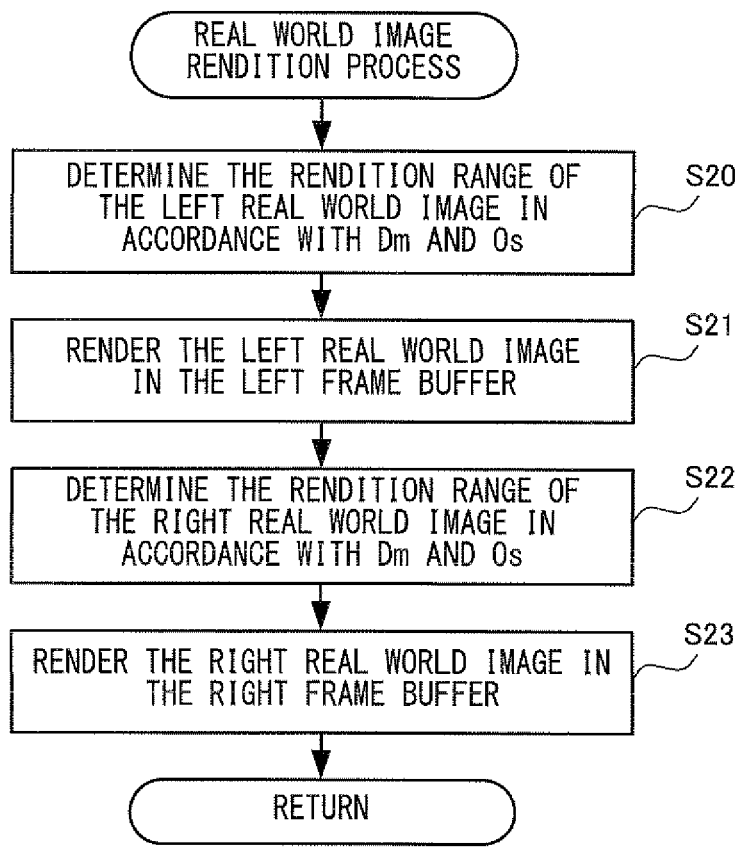
FIG. 10 is a flowchart showing a flow of a real world image rendition process.

At step S20 in FIG. 10, the CPU 311 determines a rendition range of the left real world image based on the offset Os (a fixed value in the present embodiment (for example 5 cm)) and the depth distance Dm of the point of origin in the marker coordinate system calculated at step S11. The offset Os is a variable indicating how further in the background the marker 60 appears to the user from the screen of the upper LCD 22. The offset Os may be defined with a unit used in the real world (for example, cm), or may be defined with a unit used in the virtual space (or marker coordinate system).

Figure 18:
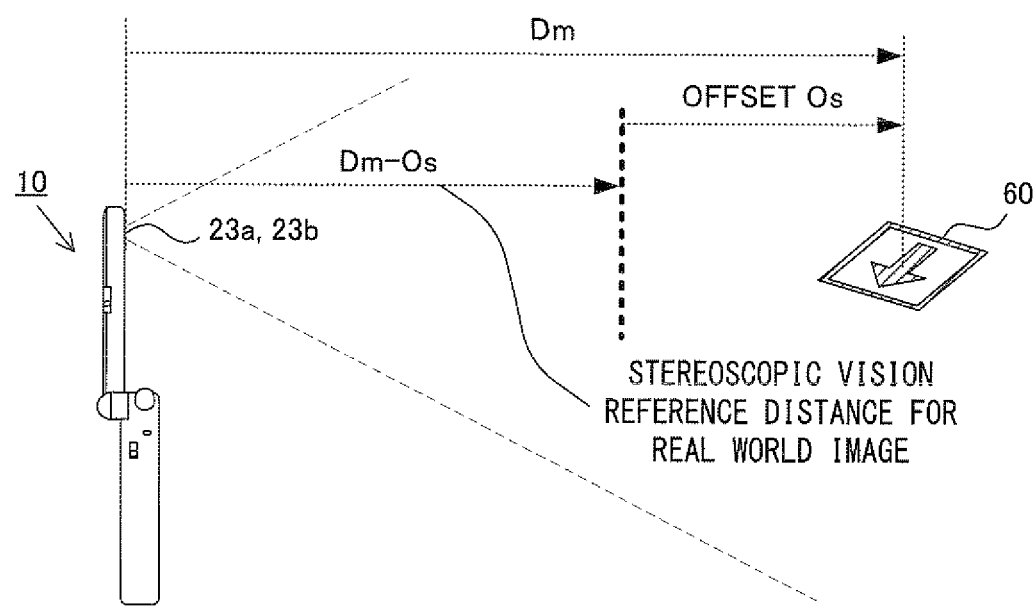
FIG. 18 is a diagram illustrating a stereoscopic vision reference distance for a real world image.
Figure 19:
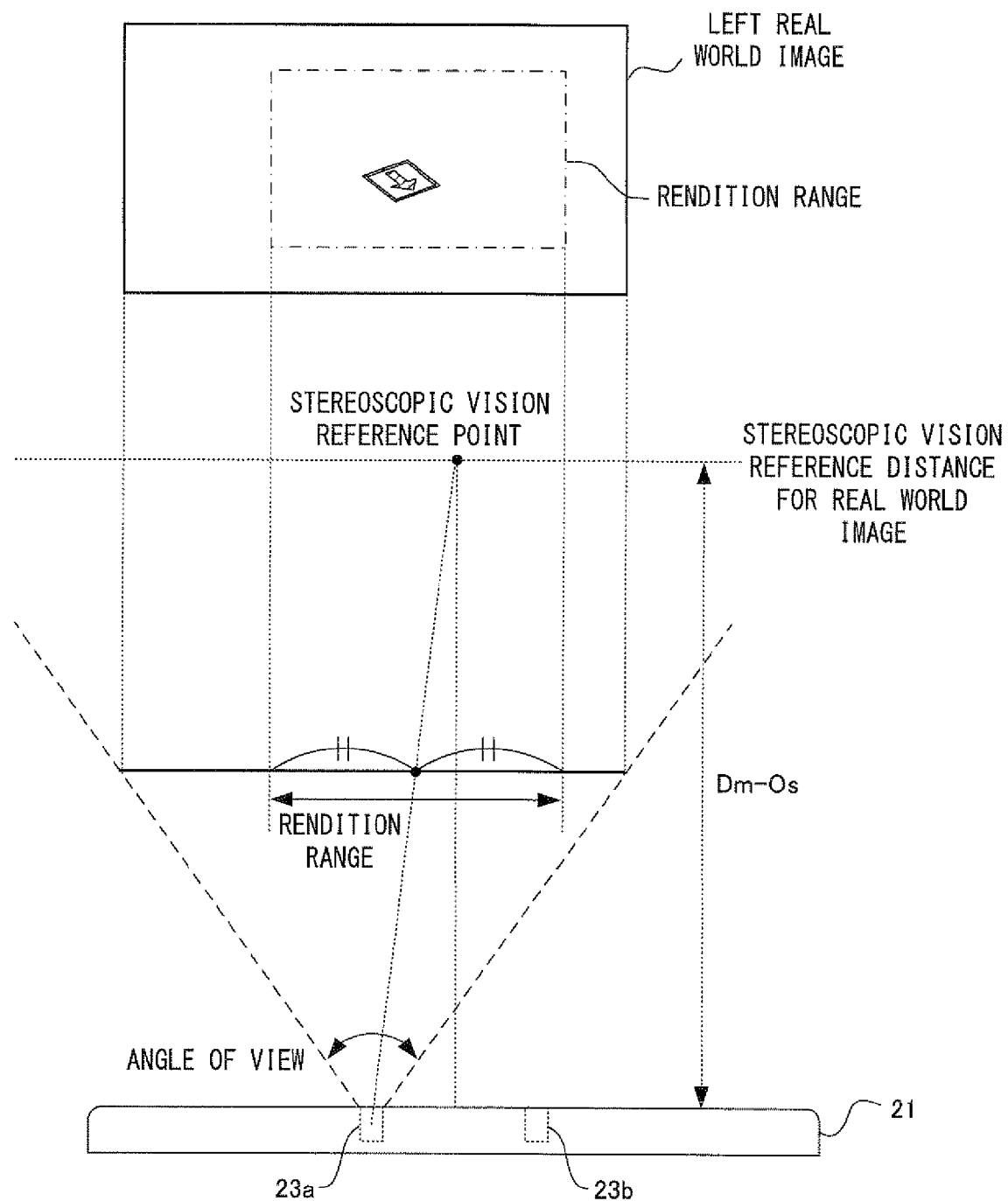
FIG. 19 is a diagram illustrating a rendition range of the left real world image.

Specifically, first, as shown in FIG. 18, the CPU 311 determines a stereoscopic vision reference distance for the real world image, by subtracting the offset Os from the depth distance Dm of the point of origin in the marker coordinate system. A "stereoscopic vision reference distance" is a depth distance and a distance at which a display target separated from a camera in an imaging direction thereof by this distance appears to the user with a predetermined sense of depth (hereinafter, referred to as a sense of depth A). Furthermore, the stereoscopic vision reference distance for the real world image is a distance at which a real object separated from a real camera (the outer imaging section 23) in an imaging direction thereof by this distance in the real world appears to the user with the sense of depth A. Furthermore, a stereoscopic vision reference distance for the virtual world image is a distance at which a virtual object separated from a virtual camera in an imaging direction thereof by this distance in the virtual world appears to the user with the sense of depth A. In the present embodiment, the sense of depth A is a sense of depth identical to that of the screen (which means, appears as if having a depth identical to the screen of the upper LCD 22); in other words, an amount of display-deviation on the screen between a real object and a virtual object at the stereoscopic vision reference distance is 0 (an object image in an image for the left eye and the object image in an image for the right eye are displayed at an identical position on the screen). In the present embodiment, the stereoscopic vision reference distance for the real world image is constant; however, the stereoscopic vision reference distance for a virtual world image is set for each virtual object. More specifically, different stereoscopic vision reference distances are set for virtual objects having different depth distances.

Next, based on the stereoscopic vision reference distances determined as described above, as shown in FIG. 19, a rendition range for the left real world image is determined. More specifically, determined as the rendition range of the left real world image is a predetermined range whose center is defined by a stereoscopic vision reference point in the left real world image, wherein the stereoscopic vision reference point is a point at which a line drawn from a midpoint of the outer imaging section (left) 23a and the outer imaging section (right) 23b to a stereoscopic vision reference surface perpendicularly intersects the stereoscopic vision reference surface (a surface perpendicular to the imaging direction, and separated from the midpoint by the stereoscopic vision reference distance). In other words, the rendition range is determined such that the stereoscopic vision reference point is displayed in the center (the same applies to the right real world image). It should be noted that, the stereoscopic vision reference point is on a straight line that is orthogonal to a line segment connecting the two imaging sections and that intersects the midpoint of the two imaging sections; and the stereoscopic vision reference point can also be specified as a point separated from the midpoint by the stereoscopic reference distance in the imaging direction.

Figure 20:
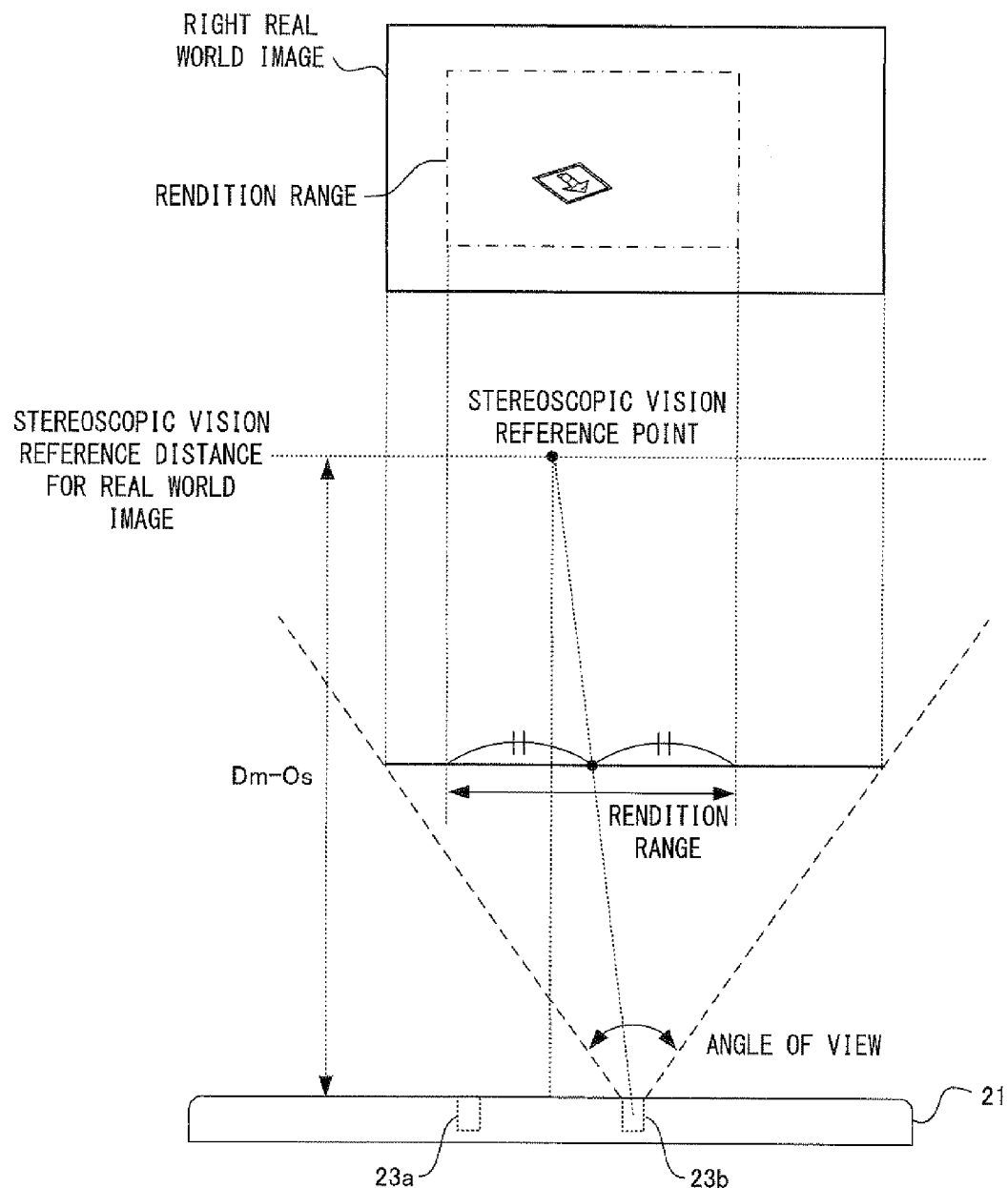
FIG. 20 is a diagram illustrating a rendition range of the right real world image.

It should be noted that, when determining a rendition range for the right real world image at step S22 described later, a predetermined range whose center is the said stereoscopic vision reference point in the right real world image is determined as the rendition range for the right real world image, as shown in FIG. 20. As a result, the position of the stereoscopic vision reference point in the image for the left eye and the position of the stereoscopic vision reference point in the image for the right eye, which are displayed on the upper LCD 22, match each other on the screen of the upper LCD 22, and the stereoscopic vision reference point will appear to the user as being at a position identical to the screen of the upper LCD 22 (thus, the stereoscopic vision reference point will not be viewed at a position in the foreground of the screen or in the background the screen). The same applies to all points on the stereoscopic vision reference surface in addition to the stereoscopic vision reference point.

At step S21, the CPU 311 renders the rendition range for the left real world image determined at step S20 on a predetermined storage area (hereinafter, referred to as a left frame buffer) in the VRAM 313 for temporarily storing the image for the left eye, which is to be supplied to the upper LCD 22.

At step S22, the CPU 311 determines a rendition range for the right real world image based on the offset Os and the depth distance Dm of the point of origin in the marker coordinate system calculated at step S11.

At step S23, the CPU 311 renders the rendition range of the right real world image determined at step S22 on a predetermined storage area (hereinafter, referred to as a right frame buffer) in the VRAM 313 for temporarily storing the image for the right eye, which is to be supplied to the upper LCD 22.

Figure 21:
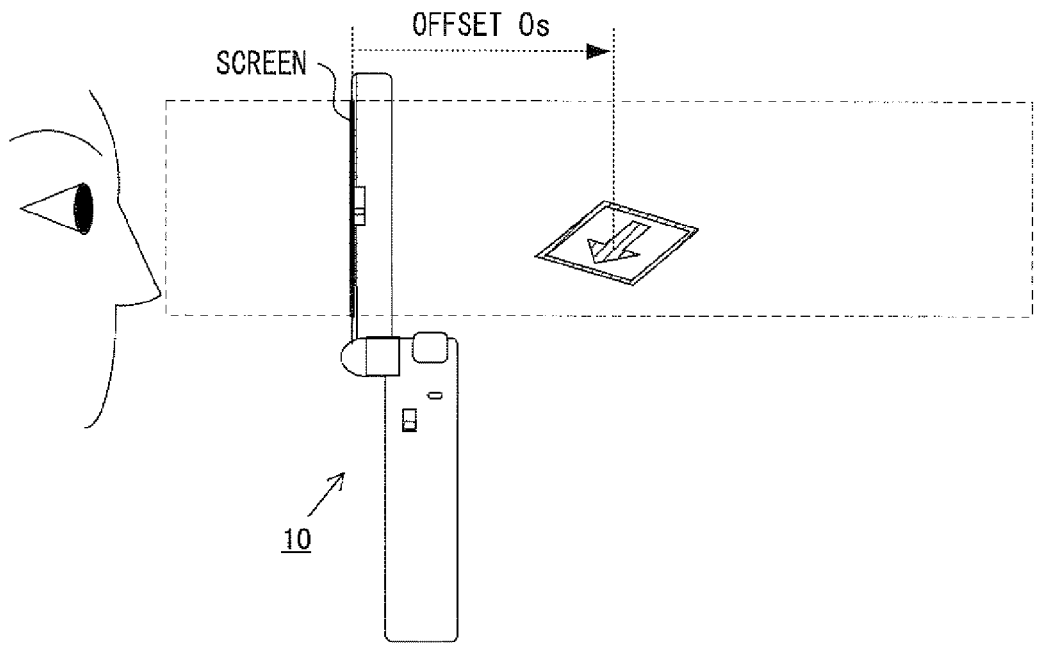
FIG. 21 is a diagram illustrating how a marker is viewed through the screen of the upper LCD 22.

When a stereoscopic image is displayed on the upper LCD 22 based on the images rendered in the right frame buffer and the left frame buffer, the marker 60 will appear to the user as if it is in the background of the screen of the upper LCD 22 by an amount of the offset Os (for example, 5 cm) as shown in FIG. 21.

When the real world image rendition process as described above ends, the process advances to step S13 in FIG. 9.

At step S13 in FIG. 9, the CPU 311 performs a game process. Details of the game process will be described in the following with reference to the flowchart in FIG. 11.

(Game Process)

Figure 11:
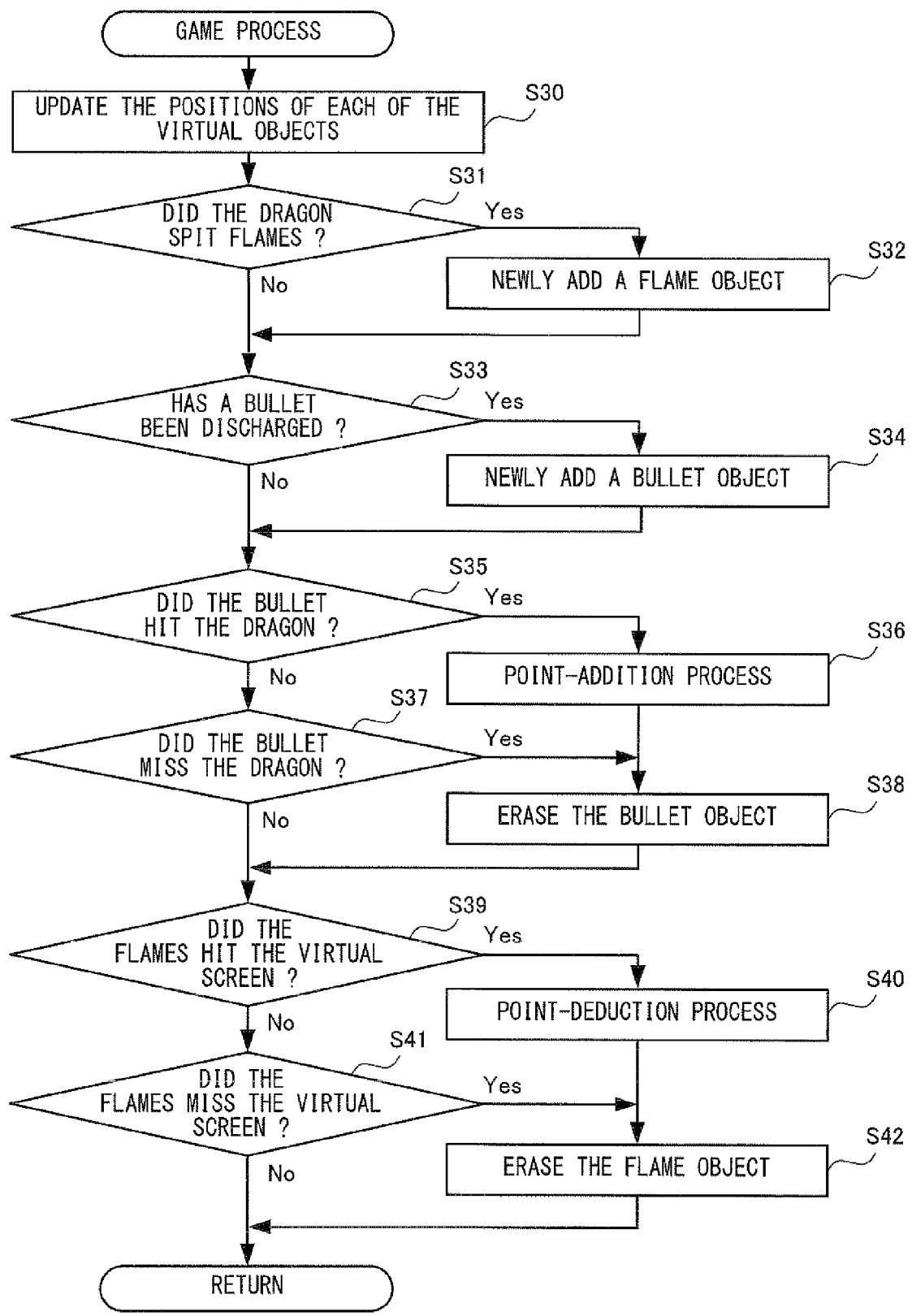
FIG. 11 is a flowchart showing a flow of a game process.

At step S30 in FIG. 11, the CPU 311 updates the positions of each of the virtual objects (the dragon object 61, the flame object 62, and the bullet object 63) (if necessary, also updates the attitudes). For example, the position of the flame object 62 is updated so as to become farther away from the dragon object 61; and the position of the bullet object 63 is updated so as to become farther away from a virtual screen (a surface that is separated from the virtual camera in the imaging direction by a stereoscopic vision reference basis distance; a virtual object existing on this surface is viewed as having a sense of depth identical to the screen). It should be noted that, in the present embodiment, as one example, the positions of the respective virtual objects are represented as coordinates of the marker coordinate system.

At step S31, the CPU 311 determines whether the dragon has spit flames, and if flames have been spit, the process advances to step S32, and if not, the process advances to step S33. In the present embodiment, whether the dragon has spit flames is determined, for example, based on random numbers.

At step S32, the CPU 311 newly adds the flame object 62 in the virtual space. More specifically, the new flame object 62 is disposed in proximity of the dragon object 61.

At step S33, the CPU 311 determines whether a bullet has been discharged, and if it has been discharged, the process advances to step S34, and if not, the process advances to step S35. In the present embodiment, for example, it is determined that a bullet has been discharged when the L button 14G or the R button 14H is pushed by the user.

At step S34, the CPU 311 newly adds the bullet object 63 in the virtual space. More specifically, the new bullet object 63 is disposed in proximity of the virtual screen.

At step S35, the CPU 311 determines whether the bullet has hit the dragon, and if it has hit the dragon, the process advances to step S36, and if not, the process advances to step S37.

At step S36, the CPU 311 performs a point-addition process of adding predetermined point(s) to a game score, and then, the process advances to step S38.

At step S37, the CPU 311 determines whether the bullet has missed the dragon, and if it has missed the dragon, the process advances to step S38, and if not, the process advances to step S39.

At step S38, the CPU 311 erases the bullet object 63 from the virtual space, and then the process advances to step S39.

At step S39, the CPU 311 determines whether the flames have hit the virtual screen, and when they have hit the virtual screen, the process advances to step S40, and if not, the process advances to step S41.

At step S40, the CPU 311 performs a point-deduction process of subtracting predetermined point(s) from the game score, and then the process advances to step S42.

At step S41, the CPU 311 determines whether the flames have missed the virtual screen, and if it has missed the virtual screen, the process advances to step S42, and if not, the game process ends.

At step S42, the CPU 311 erases the flame object 62 from the virtual space and ends the game process.

When the game process as described above ends, the process advances to step S14 in FIG. 9.

Figure 22:
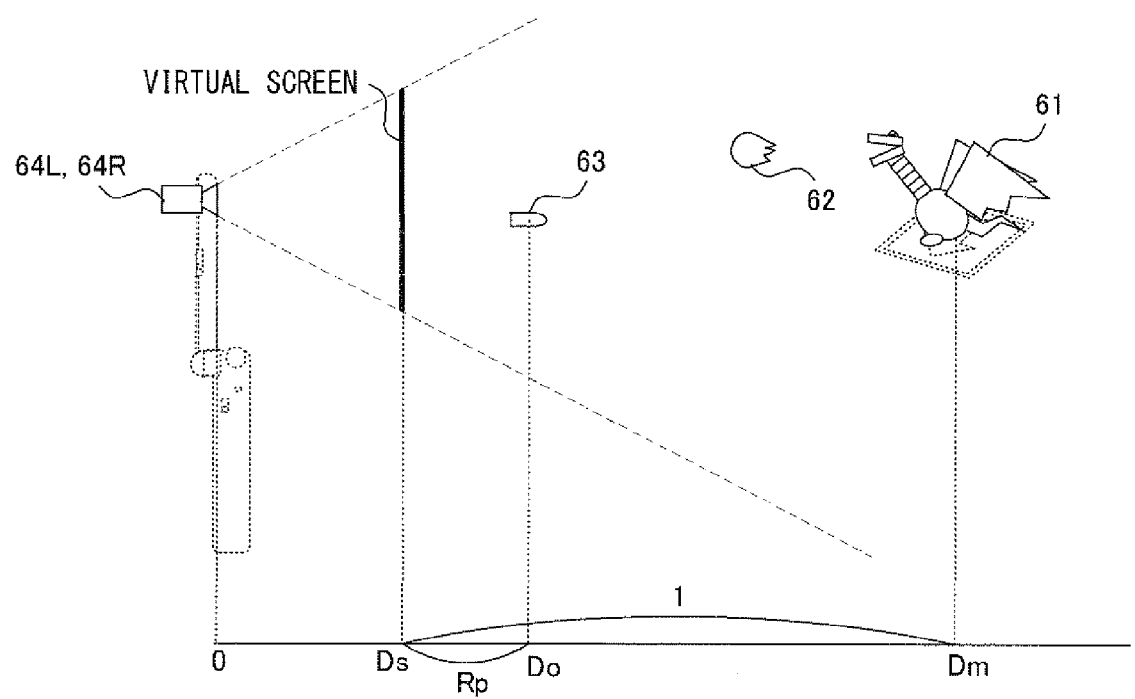
FIG. 22 is a diagram illustrating examples of positions of a virtual screen and various virtual objects in a virtual space.

At step S14 in FIG. 9, the CPU 311 selects one virtual object from among one or more virtual objects disposed in the virtual space. The processes at the following step S15 and step S16 are performed on the virtual object selected here. The following descriptions are provided under an assumption that the dragon object 61, the flame object 62, and the bullet object 63 are disposed in the virtual space at positions as shown in FIG. 22.

At step S15, the CPU 311 performs a stereoscopic vision reference distance determination process. As previously described, a stereoscopic vision reference distance is determined for each of the virtual objects. The stereoscopic vision reference distance determination process is a process for individually determining the stereoscopic vision reference distance for each of the virtual objects. Details of the stereoscopic vision reference distance determination process will be described in the following with reference to the flowchart in FIG. 12.

(Stereoscopic Vision Reference Distance Determination Process)

At step S50 in FIG. 12, the CPU 311 calculates a depth distance Do of the virtual object (the virtual object selected at step S14 in FIG. 9; the same applies hereinafter). The depth distance Do of the virtual object is a distance from the virtual cameras 64L, 64R to the virtual object in the imaging direction. For example, a Z-axis value of coordinates obtained by multiplying the coordinates indicating the current position of the virtual object to the left view matrix 72L (thus, coordinates of a point of origin in the marker coordinate system represented in the left virtual camera coordinate system) is determined as the depth distance Do of the virtual object.

At step S51, the CPU 311 determines whether the depth distance Do of the virtual object calculated at step S50 is larger than a stereoscopic vision reference basis distance Ds; and if it is larger, the process advances to step S52, and if not, the process advances to step S54. In the present embodiment, the stereoscopic vision reference distance is set for each of the virtual objects. The "stereoscopic vision reference basis distance" is a distance that becomes a basis to determine the stereoscopic vision reference distance; and the stereoscopic vision reference distance of the virtual object is determined from a difference between the stereoscopic vision reference basis distance Ds and the depth distance Do of the virtual object. More specifically, when the stereoscopic vision reference basis distance Ds and the depth distance Do of the virtual object match each other, the stereoscopic vision reference distance for the particular virtual object matches the stereoscopic vision reference basis distance Ds, and this virtual object is displayed with the sense of depth A. Furthermore, as a difference between the stereoscopic vision reference basis distance Ds and the depth distance Do of the virtual object becomes larger, the stereoscopic vision reference distance of the virtual object shifts closer to the depth distance Do of the virtual object than the stereoscopic vision reference basis distance Ds. As a result, a change in the sense of depth of the virtual object can be made smaller than the actual change in the depth position. Therefore, even when there are virtual objects existing at various depth positions, the differences in the sense of depth of those virtual objects can be reduced (thus, an amount of display-deviation on the screen can be reduced), and a virtual image that is easy to view stereoscopically can be displayed. It should be noted that, in the present embodiment, when the virtual object at the depth distance Do is closer to the virtual camera than a point at the stereoscopic vision reference basis distance Ds, the stereoscopic vision reference distance for the virtual object is set to match the stereoscopic vision reference basis distance Ds. In the present embodiment, the stereoscopic vision reference basis distance Ds is a fixed value (for example, a position 4 cm from the camera position in the imaging direction). The stereoscopic vision reference basis distance Ds may be defined with a unit used in the real world (for example, cm), or may be defined with a unit used in the virtual space (or marker coordinate system).

At step S52, the CPU 311 calculates a ratio Rp based on the stereoscopic vision reference basis distance Ds, the depth distance Dm of the point of origin in the marker coordinate system, and the depth distance Do of the virtual object. The ratio Rp represents a difference between the depth distance Do and the stereoscopic vision reference basis distance Ds of each of the virtual objects (in the example in FIG. 22, the bullet object 63) when a difference between the stereoscopic vision reference basis distance Ds and the depth distance Dm of the point of origin in the marker coordinate system is defined as "1" as shown in FIG. 22. Specifically, the ratio Rp is calculated by using the following formula.

$$Rp=(Do-Ds)/(Dm-Ds)$$

At step S53, the CPU 311 calculates a stereoscopic vision reference distance F based on the ratio Rp calculated at step S52. Specifically, the stereoscopic vision reference distance F is calculated by using the following formula.

$$F=Do-(Rp \times Os)$$

In the formula described above, the value of $(Rp \times Os)$ represents a difference between the stereoscopic vision reference distance and the depth distance of the virtual object. In other words, the value of $(Rp \times Os)$ represents a distance from the stereoscopic vision reference surface to the virtual object in the imaging direction of the camera, which influences the sense of depth. Therefore, if the value of $(Rp \times Os)$ is 0, when the virtual object is stereoscopically displayed on the upper LCD 22, the virtual object will appear to the user with a sense of depth obtained at a position identical to that of the screen of the upper LCD 22. Furthermore, as the value of $(Rp \times Os)$ becomes larger, the virtual object will appear to the user as if it is at a position further in the background of the screen of the upper LCD 22. As a result, a virtual object at a depth distance obtained by subtracting the offset Os from the depth distance Dm of the point of origin in the marker coordinate system is displayed with a sense of depth as if being at a position 5 cm to the background from the screen.

At step S54, the CPU 311 determines the stereoscopic vision reference distance F to be a value identical to the stereoscopic vision reference basis distance Ds.

Figure 24:
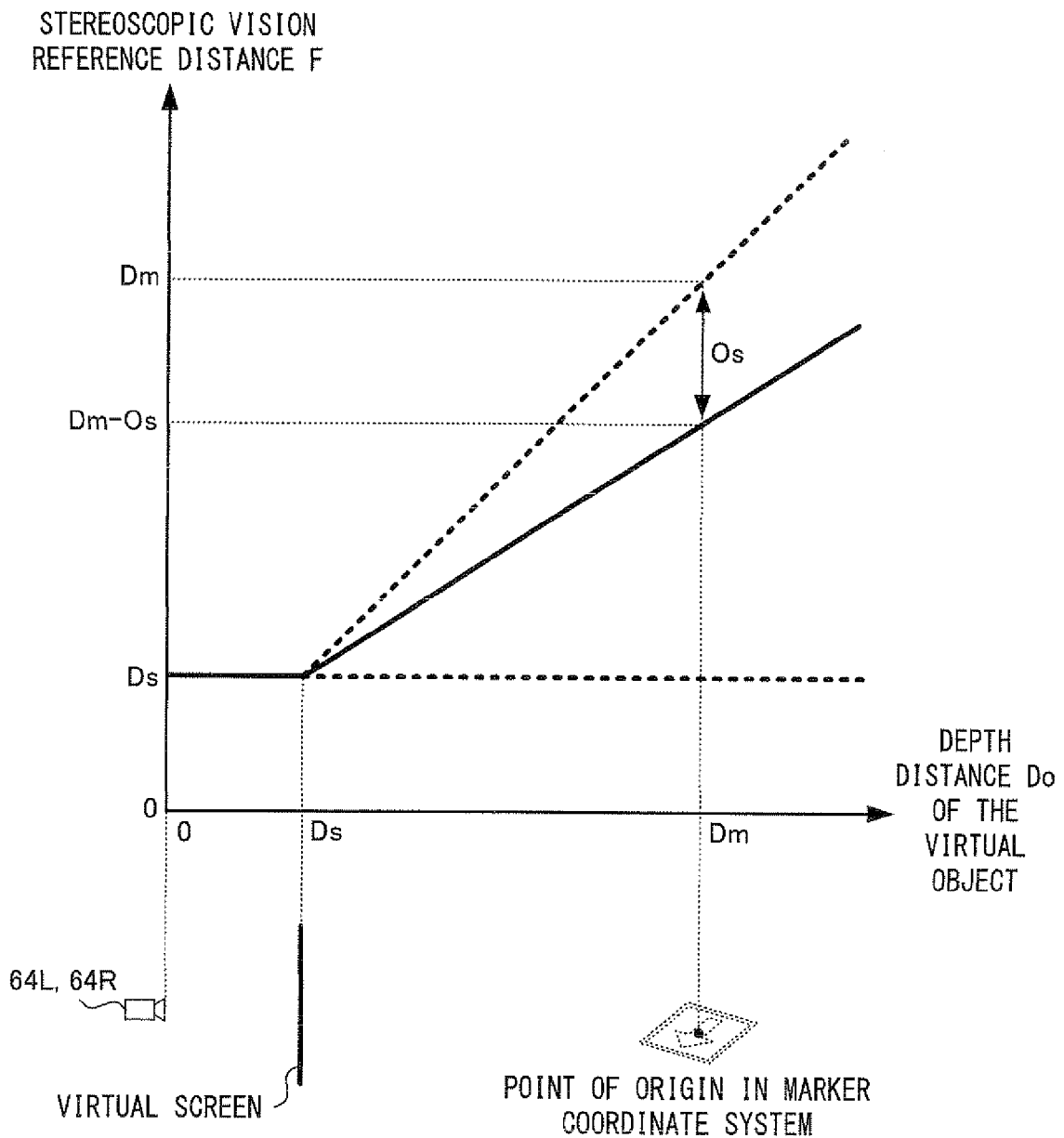
FIG. 24 is a diagram illustrating one example of a correspondence relationship between a stereoscopic vision reference distance F and a depth distance Do of a virtual object.

A solid line in FIG. 24 shows the correspondence relationship of the depth distance Do of the virtual object and the stereoscopic vision reference distance F determined at step S53 or step S54.

When the stereoscopic vision reference distance determination process as described above ends, the process advances to step S16 in FIG. 9.

At step S16 in FIG. 9, the CPU 311 renders the virtual object (the virtual object selected at step S14) based on the stereoscopic vision reference distance determined at step S15. Specifically, based on the stereoscopic vision reference distance determined at step S15, the image stored in the left frame buffer is overwritten by an image of the virtual object viewed from the left virtual camera 64L, and the image stored in the right frame buffer is overwritten by an image of the virtual object viewed from the right virtual camera 64R.

Figure 25:
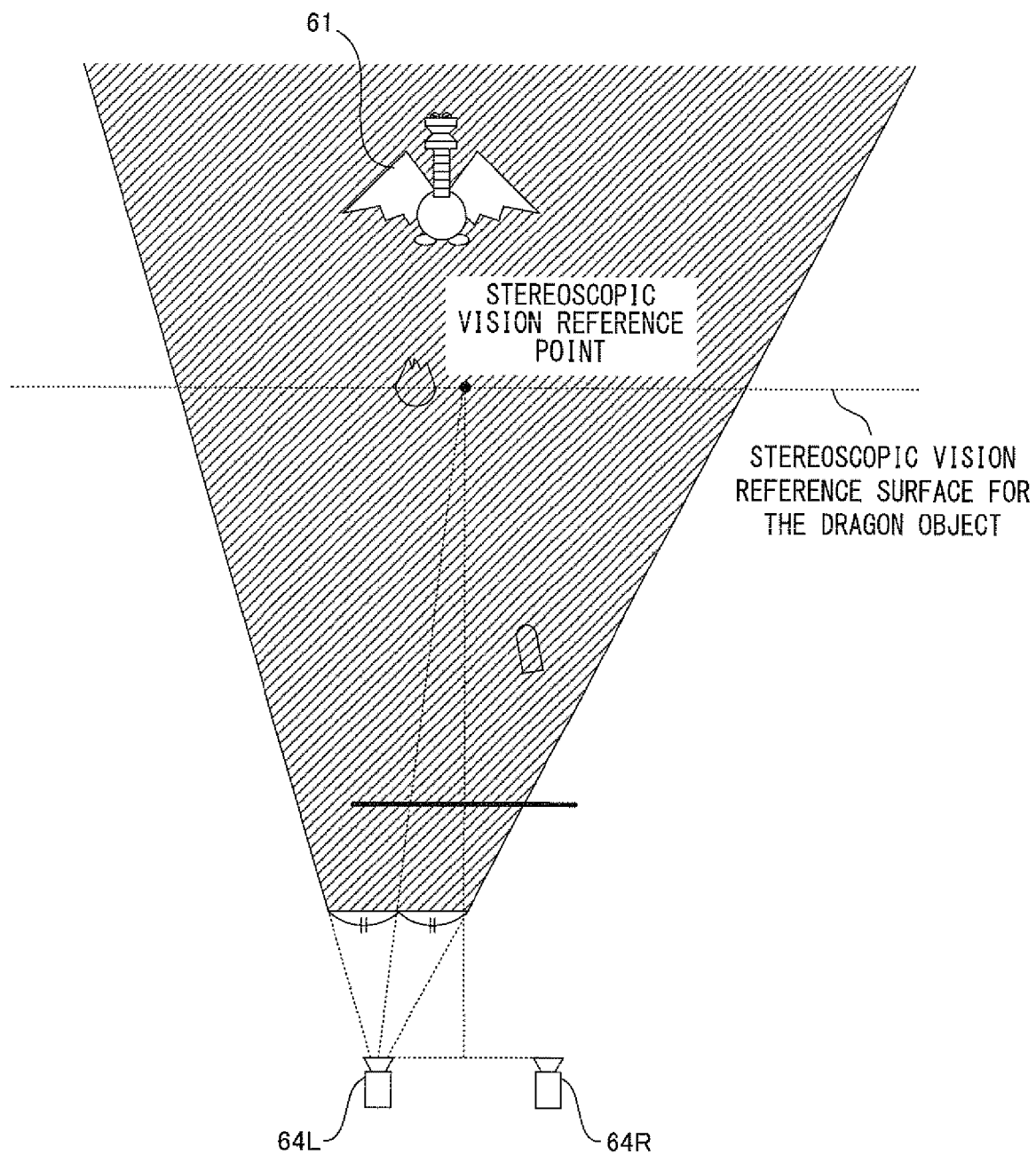
FIG. 25 is a diagram illustrating a rendition range of the left virtual camera 64L when rendering a dragon object.
Figure 26:
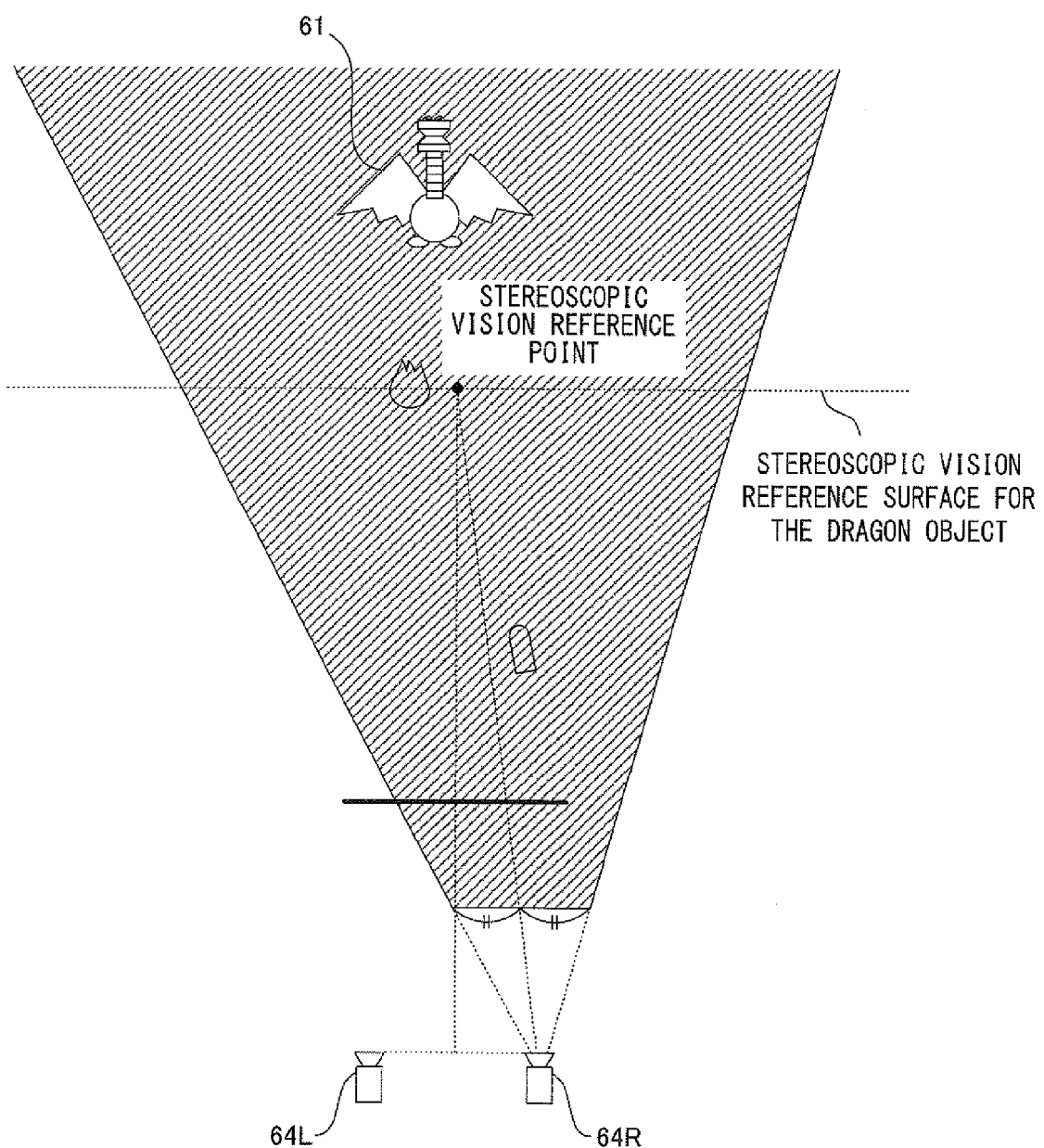
FIG. 26 is a diagram illustrating a rendition range of the right virtual camera 64R when rendering the dragon object.

A shaded area in FIG. 25 shows a rendition range that is used when generating an image of the dragon object 61 viewed from the left virtual camera 64L. As shown in FIG. 25, determined as the rendition range of the left virtual camera 64L is a predetermined space whose center can be viewed from the left virtual camera 64L as being at a stereoscopic vision reference point, wherein the stereoscopic vision reference point is a point at which a line drawn from a midpoint between the left virtual camera 64L and the right virtual camera 64R to a stereoscopic vision reference surface for the dragon object perpendicularly intersects the stereoscopic vision reference surface. By using the left view matrix 72L and a projection matrix in accordance with the rendition range, an image of the dragon object 61 viewed from the left virtual camera 64L is generated. When an image of the dragon object 61 viewed from the right virtual camera 64R is generated, similarly, as shown in FIG. 26, a predetermined space, whose center can be viewed from the right virtual camera 64R as being at the stereoscopic vision reference point, is determined as the rendition range for the right virtual camera 64R.

It should be noted that, as described above, although the projection matrixes of the virtual cameras are changed in accordance with the depth position of the virtual object (depth distance), the distance between the virtual cameras (the distance between the left virtual camera and the right virtual camera) is not changed. Therefore, although the sense of depth changes in accordance with the depth position of the virtual object (depth distance), the stereoscopic effect of the virtual object itself is not impaired.

Furthermore, since the position of the virtual cameras do not change in accordance with the depth position of the virtual object (depth distance), the virtual image itself will not be an image that gives an odd impression.

Figure 27:
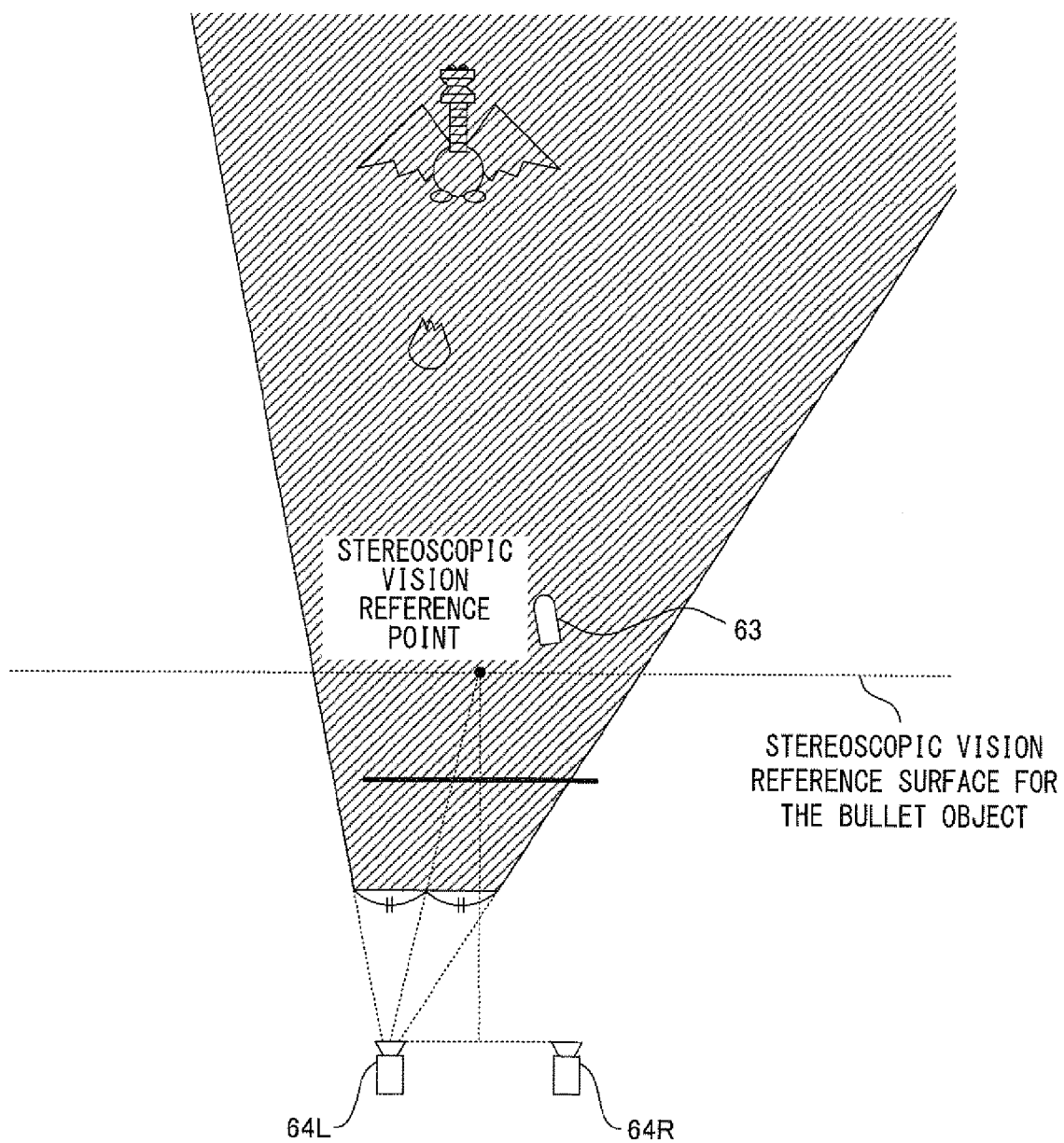
FIG. 27 is a diagram illustrating the rendition range of the left virtual camera 64L when rendering a bullet object.
Figure 28:
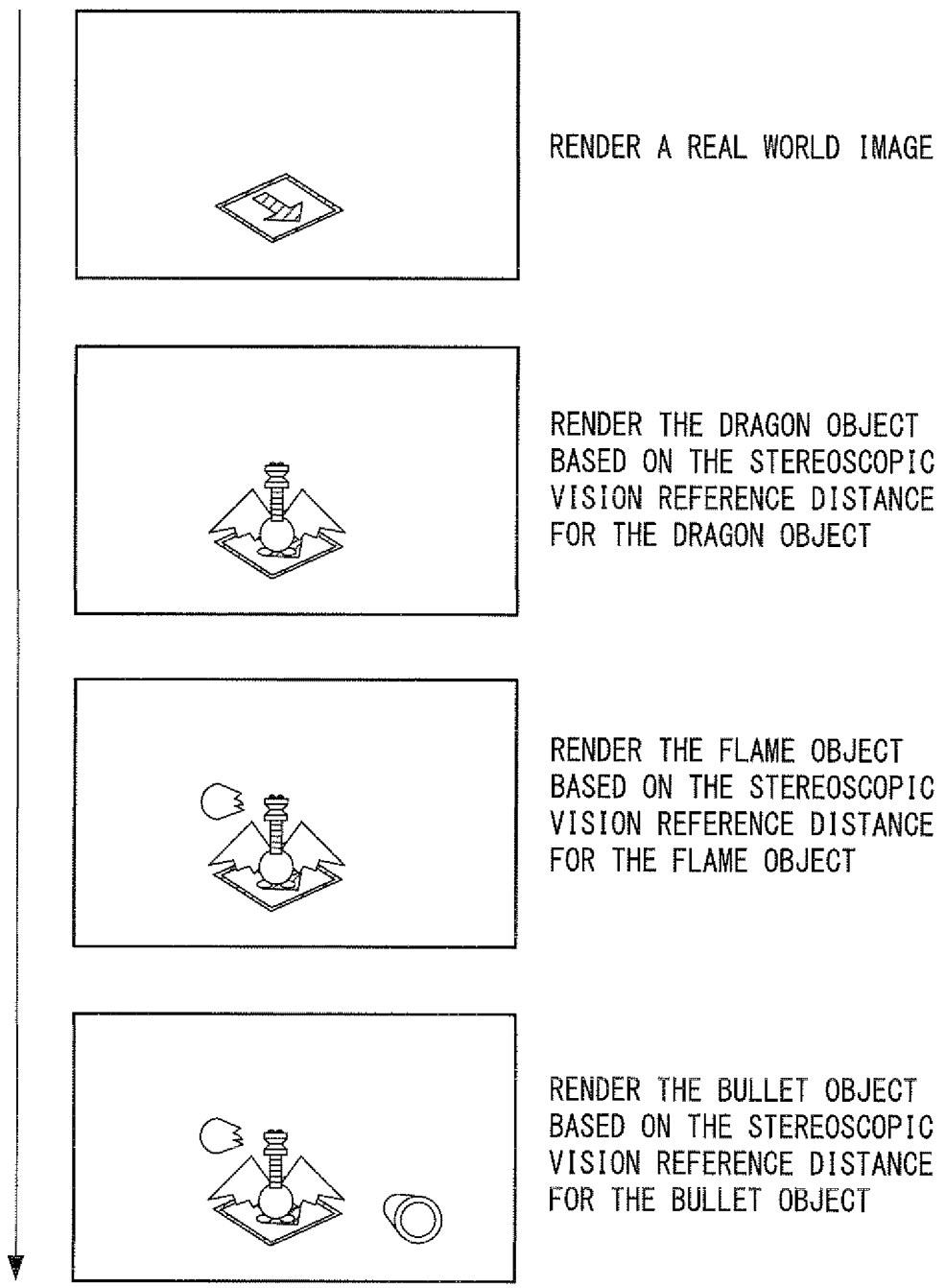
FIG. 28 is a diagram illustrating how virtual objects are sequentially combined with the real world image.

A shaded area in FIG. 27 shows a rendition range that is used when generating an image of the bullet object 63 viewed from the left virtual camera 64L. As shown in FIG. 27, determined as the rendition range of the left virtual camera 64L is a predetermined space whose center can be viewed from the left virtual camera 64L as being at a stereoscopic vision reference point, wherein the stereoscopic vision reference point is a point at which a line drawn from the midpoint of the left virtual camera 64L and the right virtual camera 64R to a stereoscopic vision reference surface for the bullet object perpendicularly intersects the stereoscopic vision reference surface.

At step S17, the CPU 311 determines whether all the virtual objects disposed in the virtual space have been rendered (excluding any virtual objects that cannot be viewed from the right virtual camera 64R and the left virtual camera 64L). If all the virtual objects have been rendered, the process advances to step S18, and if not, the process returns to step S14.

As a result of the processes described above, the left real world image rendered in the left frame buffer at step S21 in FIG. 10, and the right real world image rendered in the right frame buffer at step S23 in FIG. 10 are sequentially combined with the respective virtual objects in the virtual space (FIG. 28 as a reference); and then, supplied to the upper LCD 22 as the image for the left eye and the image for the right eye at a predetermined timing.

Figure 29:
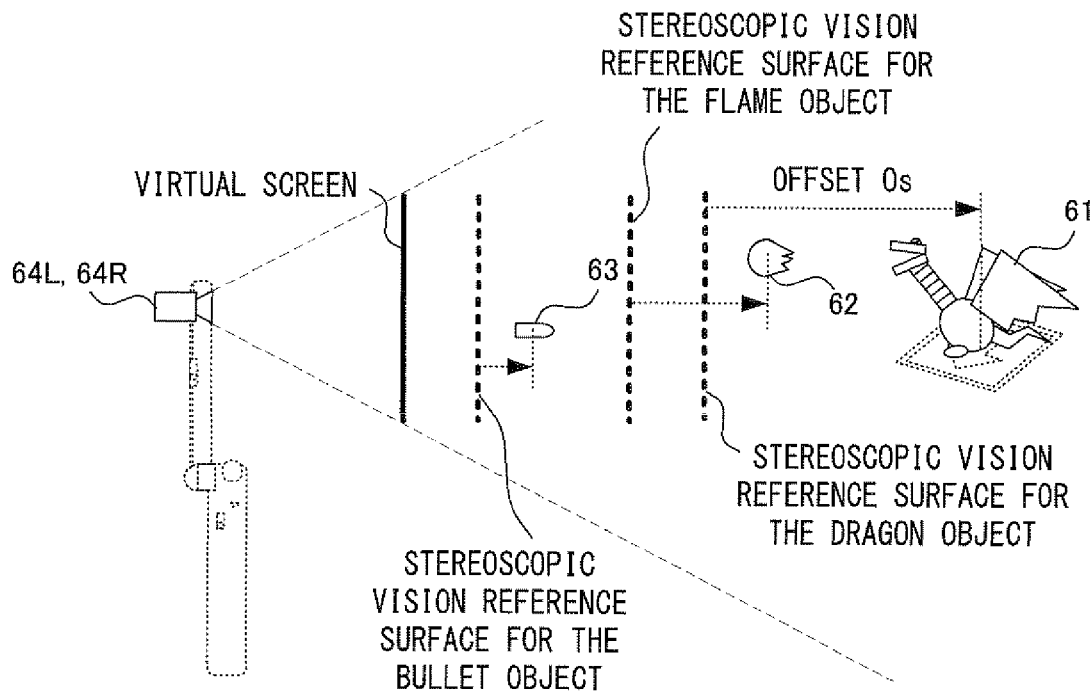
FIG. 29 is a diagram illustrating a stereoscopic vision reference distance determined for every virtual object.
Figure 30:
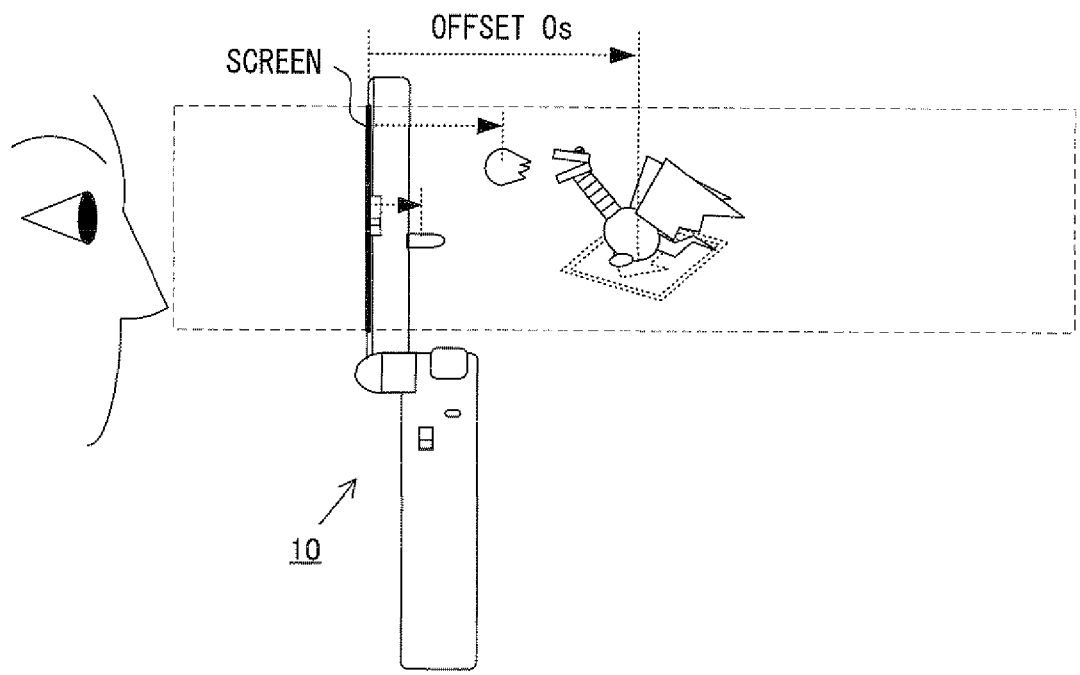
FIG. 30 is a diagram illustrating how virtual objects are viewed through the screen of the upper LCD 22.

FIG. 29 shows stereoscopic vision reference surfaces that are individually determined for each of the virtual objects (the stereoscopic vision reference surface for the dragon object, the stereoscopic vision reference surface for the flame object, and the stereoscopic vision reference surface for the bullet object). According to the present embodiment, as the depth position of the virtual object shifts closer to the virtual screen (a surface that is separated from the camera in the imaging direction by the stereoscopic vision reference basis distance) than the point of origin in the marker coordinate system, the stereoscopic vision reference surface of the virtual object shifts closer to the virtual cameras 64L, 64R, and the distance in the depth direction (the imaging direction of the camera) from the stereoscopic vision reference surface to the virtual object becomes smaller. As a result, when viewed from the user, the virtual space alone appears as if it has shrunk in the depth direction while the three dimensional shape of the virtual object remains intact. In FIG. 29, the distance in the depth direction between the dragon object 61 and the stereoscopic vision reference surface for the dragon object is the offset Os. Furthermore, the closer a virtual object is located to the virtual screen beyond the dragon object 61, the smaller the distance in the depth direction between the virtual object and the stereoscopic vision reference surface of the virtual object becomes. Therefore, as shown in FIG. 30, when the user views the image that is stereoscopically displayed on the upper LCD 22, the dragon object 61 appears as if being at a position in background of the screen by an amount the offset Os (for example, 5 cm), the flame object 62 appears as if being at a position slightly in the foreground of the dragon object 61, and the bullet object 63 appears as if being at a position slightly in the foreground of the flame object 62.

(Comparative Example)

In order to show the advantageous effect of the present embodiment in a further easily understandable manner, several comparative examples are provided in the following, and problems inherent to those will be described.

In a first comparative example, a case will be described in which the stereoscopic vision reference distance is statically set at a depth position identical to the virtual screen (thus, the stereoscopic vision reference distance is not changed for each of the virtual objects). In this case, as the depth distance (that is, the depth distance from the game apparatus 10 to the marker 60 in the real world) from the virtual screen to the point of origin in the marker coordinate system becomes larger, the position of the dragon object 61 stereoscopically displayed on the upper LCD 22 will be viewed by the user as being farther away (FIG. 31 as a reference). Therefore, when the depth distance from the virtual screen to the point of origin in the marker coordinate system is too large, it is necessary for the user to focus both eyes to a very distant point in the background of the screen of the upper LCD 22 in order to stereoscopically view the dragon object 61. However, in a stereoscopic display, to focus both eyes to a position very distant from the screen requires skill, and the dragon object 61 will be at a state where it cannot be stereoscopically viewed normally by many users. On the other hand, in the present embodiment, since the dragon object 61 will appear to the user as if it is positioned in the background of the screen by an amount of the offset Os (for example, 5 cm) consistently, a state can be achieved in which the dragon object 61 is consistently easily viewed stereoscopically in a normal manner.

Described next as a second comparative example is a case in which the virtual screen is set at a depth position closer to the virtual screen than the point of origin in the marker coordinate system by the amount of the offset Os as shown in FIG. 32 and the stereoscopic vision reference distance is statically set at a position identical to the virtual screen (thus, the stereoscopic vision reference distance is not changed for each of the virtual objects). In this case, as shown in FIG. 33, since the dragon object 61 will appear to the user as if it is positioned in the background of the screen by an amount of the offset Os (for example, 5 cm) consistently, a state can be achieved in which the dragon object 61 is consistently easily viewed stereoscopically in a normal manner. However, in FIG. 32, since the bullet object 63 is at a position closer to the virtual cameras 64L, 64R than the virtual screen, the bullet object 63 will appear to the user as if it is in the foreground of the screen as shown in FIG. 33. In addition, when compared to the example of the present embodiment shown in FIG. 30, since a difference between the depth position of the bullet object 63 and the depth position of the dragon object 61 viewed by the user is considerably large, for example, when the user shifts the focus of his/her eyes from the dragon object 61 to the bullet object 63 or vice versa, a moving distance of his/her focus become large and focusing becomes difficult which is a problem. In the game process, the above described point-deduction process is performed when the flame object 62 hits the virtual screen. However, as the depth distance from the virtual screen to the point of origin in the marker coordinate system (that is, the depth distance from the game apparatus 10 to the marker 60 in the real world) becomes larger, the apparent size of the flame object 62 immediately before hitting the virtual screen becomes smaller. Therefore, a problem arises where the flame object 62 hits the virtual screen even though the user has an impression that it is positioned sufficiently farther away. On the other hand, in the present embodiment, since the stereoscopic vision reference distance is individually determined for each of the virtual objects, the bullet object 63 will not appear in the foreground of the screen, and the moving distance of the focus of his/her eyes is small when shifting the focus from the dragon object 61 to the bullet object 63 or vice versa.

(Advantageous Effects of the Present Embodiment)

As described above, in the present embodiment, since the stereoscopic vision reference distance is individually determined for each of the virtual objects, the virtual objects are stereoscopically displayed on the upper LCD 22 in a manner that can be easily viewed stereoscopically.

Furthermore, in the present embodiment, since the offset Os is a fixed value, the virtual object (the dragon object 61) at a depth position identical to the point of origin in the marker coordinate system appears to the user as if being at a constant depth position regardless of the depth distance of the marker 60 viewed from the game apparatus 10. Therefore, a virtual object positioned in the vicinity of the point of origin in the marker coordinate system can be consistently stereoscopically displayed in an easily viewable manner.

Furthermore, in the present embodiment, the virtual object at a depth position identical to the virtual screen appears to the user as if being consistently at a depth position identical to the screen of the upper LCD 22. Therefore, a virtual object positioned in the vicinity of the virtual screen can be consistently stereoscopically displayed in an easily viewable manner.

Furthermore, in the present embodiment, instead of rendering the virtual objects by changing the relative depth position of the virtual cameras 64L, 64R with respect to the virtual objects for each of the virtual objects, since the virtual objects are rendered by changing the stereoscopic vision reference distance (the stereoscopic vision reference point for the left virtual camera 64L and the right virtual camera 64R shown in FIG. 25 to FIG. 27) for each of the virtual objects, the virtual objects can be stereoscopically displayed so as to appear normal.

(Alternate Example)

Figure 36:
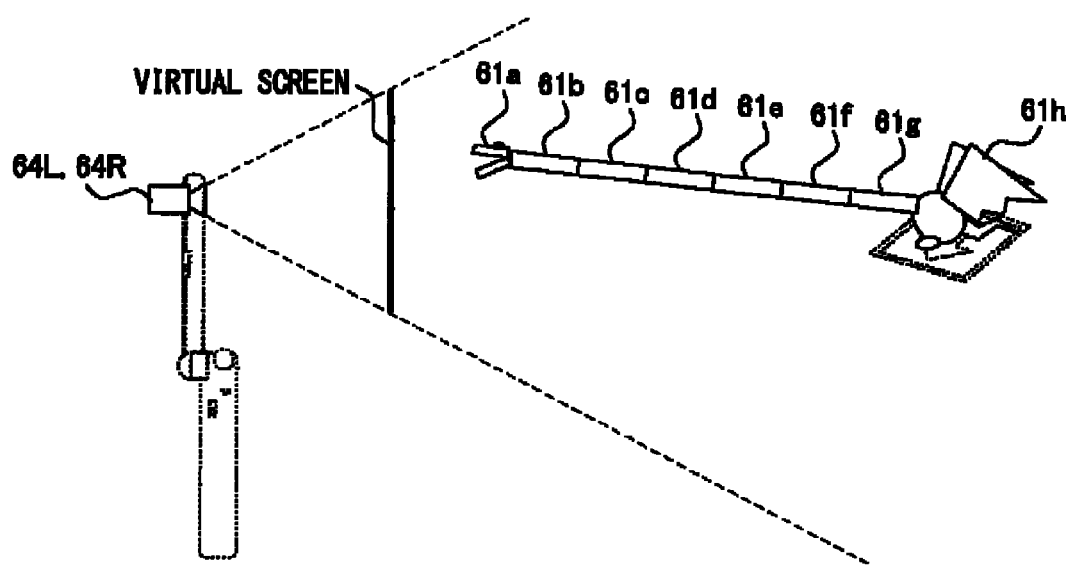
FIG. 36 is a diagram illustrating examples of positions of a virtual screen and each segment of a virtual object in a virtual space when the virtual object disposed in the virtual space is long in the depth direction and is divided into multiple segments.
Figure 37:
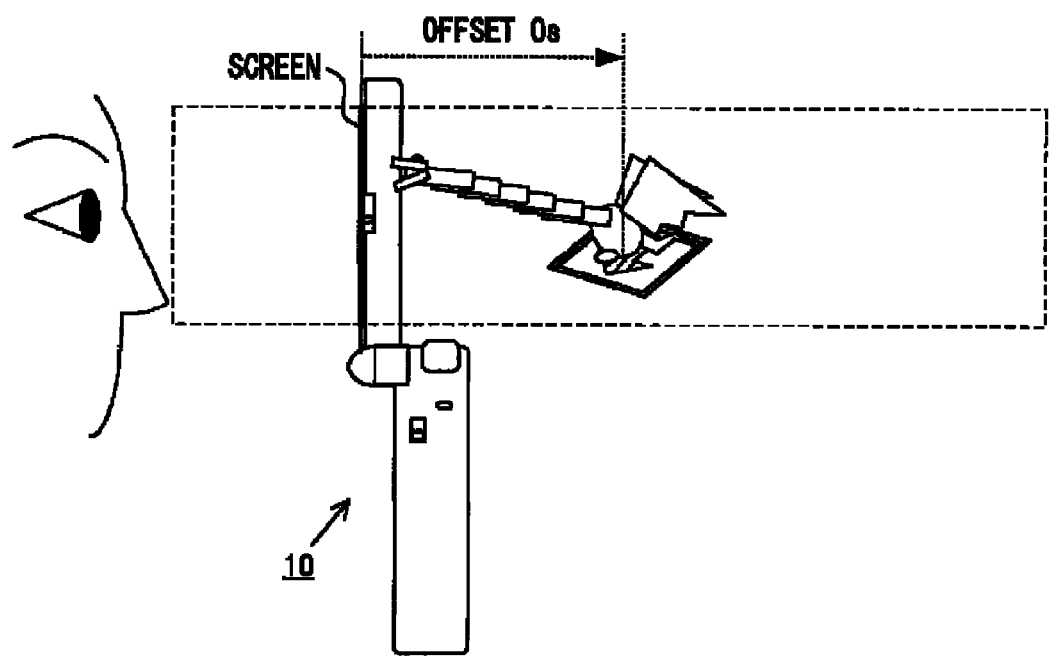
FIG. 37 is a diagram illustrating how the virtual object is viewed through the screen of the upper LCD 22 when the virtual object disposed in the virtual space is long in the depth direction and is divided in multiple segments.

It should be noted that, in the embodiment described above, the stereoscopic vision reference distance is determined for each of the virtual objects. However, in a case where a virtual object that is long in the depth direction when viewed from the virtual cameras 64L, 64R is stereoscopically displayed as shown in FIG. 34, since a farthest segment and a closest segment viewed from the virtual cameras 64L, 64R are rendered based on an identical stereoscopic vision reference distance, an unintended stereoscopic display will be obtained as shown in FIG. 35. Therefore, in such a case, as shown in FIG. 36, by forming the virtual object, which is long in the depth direction, as a plurality of virtual objects 61a to 61h, the virtual object which is long in the depth direction can be stereoscopically displayed appropriately as shown in FIG. 37.

Figure 38:
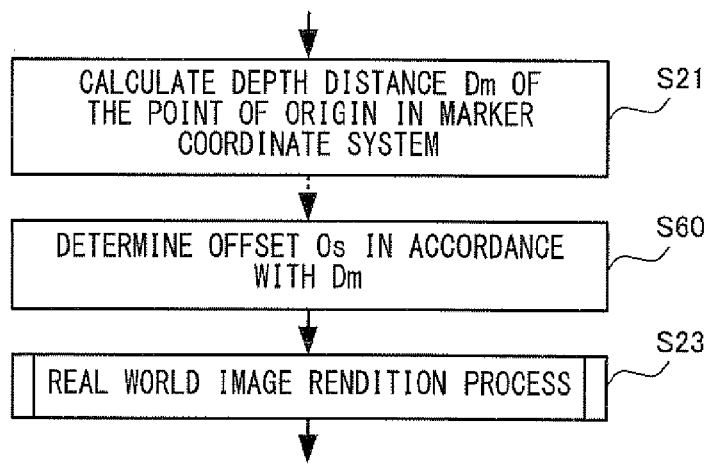
FIG. 38 is a diagram illustrating an alternate example of the main process.
Figure 39:
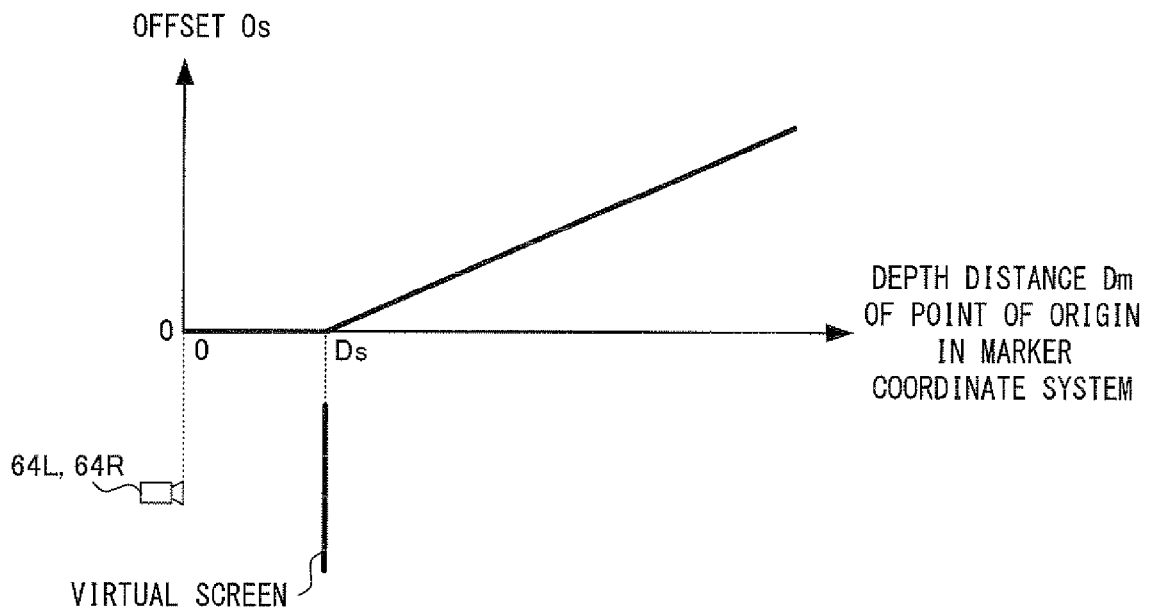
FIG. 39 is a diagram illustrating one example of a correspondence relationship between an offset Os and the depth distance Dm of a point of origin in a marker coordinate system in an alternate example.

Furthermore, in the embodiment described above, although a fixed value (for example, 5 cm) is used as the offset Os, in another embodiment, for example, the value of the offset Os may be changed in accordance with the depth position of the point of origin in the marker coordinate system. The value of the offset Os can be changed in accordance with the depth position of the point of origin in the marker coordinate system, by adding, subsequent to step S11 in FIG. 9, a process (step S60) performed by the CPU 311 to determine the offset Os in accordance with the depth distance Dm of the point of origin in the marker coordinate system as shown in FIG. 38. FIG. 39 shows one example of a correspondence relationship of the offset Os and the depth distance Dm of the point of origin in the marker coordinate system, and this relationship is used to determine the depth distance Dm in accordance with the offset Os of the point of origin in the marker coordinate system. It should be noted that, although the relationship between the offset Os and the depth distance Dm of the point of origin in the marker coordinate system is a linear relationship in FIG. 39, the relationship may be non-linear in another embodiment.

Furthermore, in the above described embodiment, as shown in FIG. 24, although the relationship between the stereoscopic vision reference distance F and the depth distance Do of the virtual object is a linear relationship, the relationship may be non-linear in another embodiment.

Furthermore in the above described embodiment, as shown in FIG. 24, although the stereoscopic vision reference distance F is constant when the depth distance Do of the virtual object is smaller than the stereoscopic vision reference basis distance Ds, in another embodiment, the stereoscopic vision reference distance F may be changed in accordance with the depth distance Do of the virtual object when the depth distance Do of the virtual object is smaller than the stereoscopic vision reference basis distance Ds.

Figure 12:
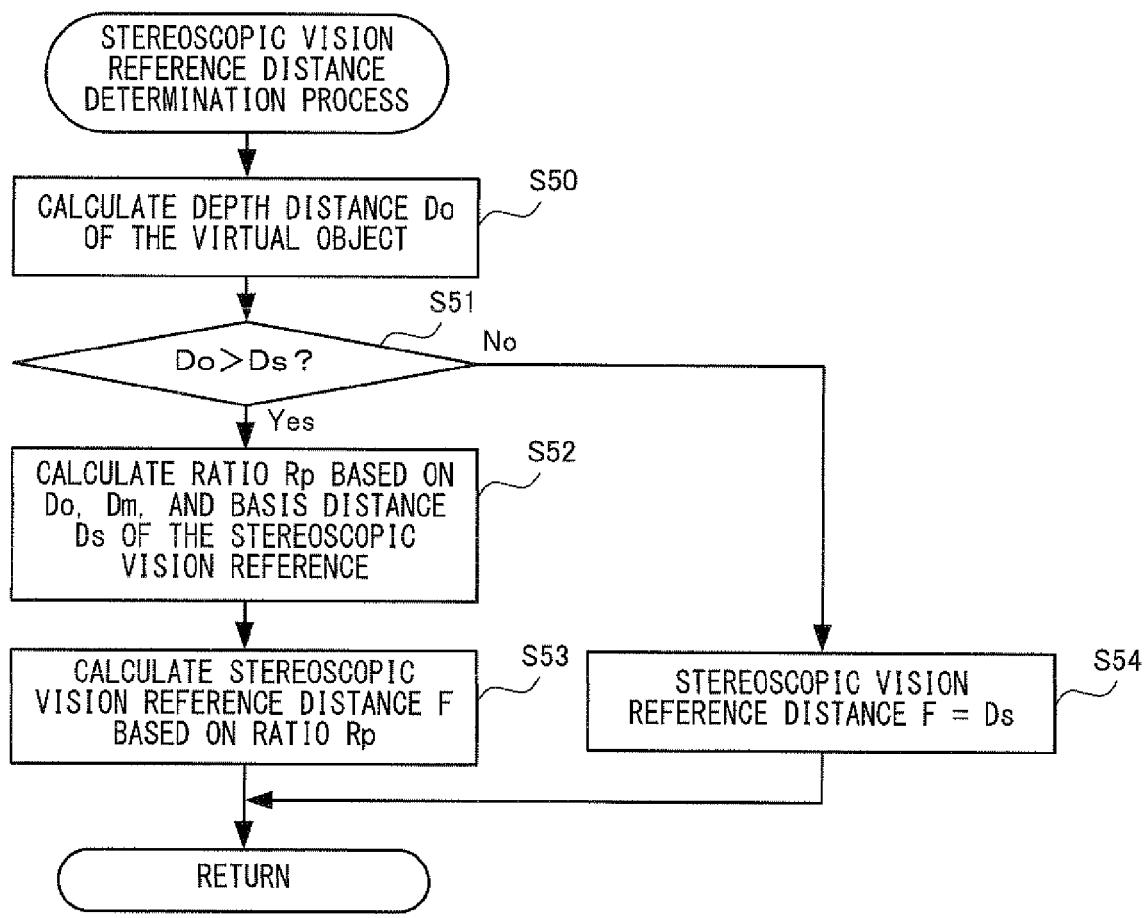
FIG. 12 is a flowchart showing a flow of a stereoscopic vision reference distance determination process.

Furthermore in the embodiment described above, although the stereoscopic vision reference distance F is calculated based on the ratio Rp calculated at step S52 in FIG. 12, in another embodiment, the stereoscopic vision reference distance F may be directly calculated without calculating the ratio Rp.

In the embodiment described above, the stereoscopic vision reference distance F is calculated in accordance with a relative position (for example, the ratio Rp) of the depth distance Do of the virtual object in relation with two depth positions, the stereoscopic vision reference basis distance Ds and the depth distance Dm of the point of origin in the marker coordinate system. In another embodiment, the stereoscopic vision reference distance F may be calculated in accordance with a relative position (for example, the ratio Rp) of the depth distance Do of the virtual object in relation with one or two depth positions that are predetermined arbitrary.

Furthermore, in the embodiment described above, the stereoscopic image is generated in accordance with the stereoscopic vision reference distance, by changing the rendition ranges (in other words, projection matrices) of the left virtual camera 64L and the right virtual camera 64R in accordance with the stereoscopic vision reference distance determined for each of the virtual objects. However, in another embodiment, the stereoscopic image may be generated in accordance with the stereoscopic vision reference distance, by changing directions of the left virtual camera 64L and the right virtual camera 64R in accordance with the stereoscopic vision reference distance determined for each of the virtual objects. Still further, in another embodiment, the stereoscopic image may be generated in accordance with the stereoscopic vision reference distance, by changing the intervals of the left virtual camera 64L and the right virtual camera 64R in accordance with the stereoscopic vision reference distance determined for each of the virtual objects.

Furthermore, in the embodiment described above, the virtual object is combined with the real world image in accordance with a result of recognizing the position and attitude of the marker 60 included in the real world image. However, in another embodiment, the virtual object may be combined with the real world image in accordance with a result of recognizing a position and attitude of an arbitrary recognition target instead of the marker 60. A person's face is one example of the recognition target.

Furthermore, in the embodiment described above, the stereoscopic image is displayed on the upper LCD 22 based on the real world image taken by the outer imaging section 23 in real-time. However, in another embodiment, the stereoscopic image may be displayed on the upper LCD 22 based on data of video images taken in the past by the outer imaging section 23, an external stereo camera, and the like.

Furthermore, in the embodiment described above, although the outer imaging section 23 is mounted on the game apparatus 10 in advance, in another embodiment, an external camera that is attachable/detachable to the game apparatus 10 may be used.

Furthermore, in the embodiment described above, although the upper LCD 22 is mounted on the game apparatus 10 in advance, in another embodiment, an external stereoscopic display that is attachable/detachable to the game apparatus 10 may be used.

Furthermore, in the embodiment described above, although a specific virtual object (the dragon object 61) is disposed at a position of the point of origin in the marker coordinate system, in another embodiment, it is possible not to have a virtual object at the position of the point of origin in the marker coordinate system.

Furthermore, in the embodiment described above, although a plurality of virtual objects are disposed in the virtual space, in another embodiment, a single virtual object may be disposed in the virtual space.

Furthermore, in the embodiment described above, although a stereoscopic image obtained by combining the virtual object with the real world image is stereoscopically displayed on the upper LCD 22, in another embodiment, only the virtual object may be stereoscopically displayed on the upper LCD 22.

Furthermore, in the embodiment described above, the position and attitude of the right virtual camera 64R are determined based on the position and attitude of the left virtual camera 64L calculated from the marker recognition result of the left real world image. However, in another embodiment, the position and attitude of the right virtual camera 64R and the position and attitude of the left virtual camera 64L may be determined by taking into consideration of the position and attitude of the left virtual camera 64L calculated from the marker recognition result of the left real world image and/or the position and attitude of the right virtual camera 64R calculated from the marker recognition result of the right real world image.

Furthermore, although the upper LCD 22 is a parallax barrier type stereoscopic display device in the embodiment described above, in another embodiment, the upper LCD 22 may be a stereoscopic display device of any other type such a lenticular lens type or the like. For example, when a lenticular lens type stereoscopic display device is used, the image for the left eye and the image for the right eye may be combined by the CPU 311 or another processor, and the combined image may be supplied to the lenticular lens type stereoscopic display device.

Furthermore, in the embodiment described above, although the virtual object and the real world image are combined and displayed by using the game apparatus 10, in another embodiment, the virtual object and the real world image may be combined and displayed by using any other information processing apparatus or information processing system (for example, PDA (Personal Digital Assistant), mobile phone, personal computer, camera, and the like).

Furthermore, although a game image is stereoscopically displayed on the upper LCD 22 in the embodiment described above, in another embodiment, any image other than a game image may be stereoscopically displayed.

Furthermore, although the image display process is executed by a single information processing apparatus (the game apparatus 10) in the embodiment described above, in another embodiment, the image display process may be divided and executed by a plurality of information processing apparatuses that are included in an image display system and are capable of communicating with each other.

While the invention has been described in detail, the foregoing description is in all aspects illustrative and not restrictive. It will be understood that numerous other modifications and variations can be devised without departing from the scope of the invention.

What is claimed is:

1. A non-transitory computer-readable storage medium having stored thereon, an image display program for stereoscopically displaying a virtual object, which is disposed in a virtual space, on a screen of a stereoscopic-viewing-enabling stereoscopic display device via a rendition of the virtual object with a pair of virtual cameras, the image display program, when executed, causing a computer to at least:
   determine a stereoscopic vision reference distance, which is a distance in an imaging direction from the pair of virtual cameras and which is used as a reference for a sense of depth of stereoscopic vision, so as to change in accordance with an imaging distance which is a distance from the virtual cameras to the virtual object in the imaging direction, wherein when the virtual object is disposed at a first depth position, the stereoscopic vision reference distance for the virtual object is determined such that a relative position of the virtual object with respect to the stereoscopic vision reference distance is a first relative position, and when the virtual object is disposed at a second depth position, the stereoscopic vision reference distance for the virtual object is determined such that the relative position of the virtual object with respect to the stereoscopic vision reference distance is a second relative position;
   set the pair of virtual cameras to obtain a view volume providing a predetermined sense of depth for the determined stereoscopic vision reference distance; and
   stereoscopically display the virtual object on the screen of the stereoscopic display device by using a pair of virtual images generated by imaging the virtual object with the set pair of virtual cameras.

2. The non-transitory computer-readable storage medium according to claim 1, wherein the predetermined sense of depth is a sense of depth of the screen of the stereoscopic display device.

3. The non-transitory computer-readable storage medium according to claim 1, wherein the image display program, when executed, further causes the computer to:
   detect a predetermined target from at least one of a pair of real world images taken by a pair of imaging sections; and
   determine a relative positional relationship between the pair of virtual cameras and a predetermined point corresponding to the target in the virtual space, based on a position of the target in the at least one of the real world image; and
   determine the stereoscopic vision reference distance in accordance with a difference between the imaging distance and a distance from the pair of virtual cameras to the predetermined point in the imaging direction.

4. The non-transitory computer-readable storage medium according to claim 1, wherein the stereoscopic vision reference distance is determined in accordance with a difference between the imaging distance and a first basis distance which is a basis for determining the stereoscopic vision reference distance.

5. The non-transitory computer-readable storage medium according to claim 4, wherein, as the imaging distance becomes larger than the first basis distance, the stereoscopic vision reference distance is determined so as to be closer to the imaging distance than the first basis distance.

6. The non-transitory computer-readable storage medium according to claim 1, wherein
when a plurality of virtual objects exist in the virtual space, a stereoscopic vision reference distance is individually determined for each of the plurality of virtual objects, and
the virtual image is generated by respectively generating images of the plurality of virtual objects by individually rendering the plurality of virtual objects based on respective stereoscopic vision reference distances, and by combining the obtained images of the plurality of virtual objects.

7. The non-transitory computer-readable storage medium according to claim 1, wherein as a depth position of the virtual object shifts closer from the first depth position to the second depth position that is disposed on a side on which the pair of virtual cameras exist with respect to the first depth position, the stereoscopic vision reference distance for the virtual object is determined such that a position at the stereoscopic vision reference distance shifts closer to the pair of virtual cameras, and such that the relative position of the virtual object with respect to the stereoscopic vision reference distance shifts toward a side on which the pair of virtual cameras exist.

8. The non-transitory computer-readable storage medium according to claim 1, wherein when the virtual object is disposed at a predetermined depth position, the stereoscopic vision reference distance for the virtual object is determined such that the relative position of the virtual object with respect to the stereoscopic vision reference distance becomes a predetermined relative position.

9. The non-transitory computer-readable storage medium according to claim 1 wherein,
when the virtual object is disposed between the first depth position and the second depth position, the stereoscopic vision reference distance for the virtual object is determined in accordance with a relative position of the virtual object with respect to the first depth position and the second depth position.

10. The non-transitory computer-readable storage medium according to claim 9, wherein when the virtual object is disposed between the first depth position and the second depth position, the stereoscopic vision reference distance for the virtual object is determined based on a ratio of a distance between the first depth position and the second depth position and a distance between the depth position of the virtual object and the second depth position.

11. The non-transitory computer-readable storage medium according to claim 1, wherein
the second depth position is disposed further toward a side of the pair of virtual cameras than the first depth position, and
the second relative position is disposed further toward a side of the pair of virtual cameras than the first relative position.

12. The non-transitory computer-readable storage medium according to claim 1, wherein the second relative position is a relative position in which a depth position at the stereoscopic vision reference distance is identical to that of the virtual object.

13. The non-transitory computer-readable storage medium according to claim 9, wherein a relative positional relationship between the first depth position and the second depth position changes depending on a situation.

14. The non-transitory computer-readable storage medium according to claim 13, wherein a relative position of the first depth position with respect to the pair of virtual cameras is variable, and a relative position of the second depth position with respect to the one pair of virtual cameras is fixed.

15. The non-transitory computer-readable storage medium according to claim 14, wherein the image display program, when executed, further causes the computer to:
detect a predetermined target from at least one of a pair of real world images taken by a pair of imaging sections; and
determine a relative positional relationship between the pair of virtual cameras and the first depth position, based on a position of the target in the at least one of the real world images.

16. The non-transitory computer-readable storage medium according to claim 15, wherein a stereoscopic image to be displayed on the stereoscopic display device is generated, by sequentially combining the pair of the real world images respectively with pair of images of the virtual object sequentially generated by using the pair of virtual cameras.

17. The non-transitory computer-readable storage medium according to claim 15, wherein the image display program, when executed, further causes the computer to determine the first relative position in accordance with a distance between the pair of virtual cameras and the first depth position.

18. The non-transitory computer-readable storage medium according to claim 1, wherein a stereoscopic image of the virtual object is generated in accordance with the determined stereoscopic vision reference distance by changing a stereoscopic vision reference point which is a point at the stereoscopic vision reference distance and which is distant equally from the pair of virtual cameras.

19. An image display apparatus for stereoscopically displaying a virtual object, which is disposed in a virtual space, on a screen of a stereoscopic-viewing-enabling stereoscopic display device via a rendition of the virtual object with a pair of virtual cameras, the image display apparatus comprising:
a computer processing system, including at least one processor, the computer processing system being configured to control the image display apparatus to perform operations comprising:
determining a stereoscopic vision reference distance, which is a distance in an imaging direction from the pair of virtual cameras and which is used as a reference for a sense of depth of stereoscopic vision, so as to change in accordance with an imaging distance which is a distance from the virtual cameras to the virtual object in the imaging direction, wherein when the virtual object is disposed at a first depth position, the stereoscopic vision reference distance for the virtual object is determined such that a relative position of the virtual object with respect to the stereoscopic vision reference distance is a first relative position, and when the virtual object is disposed at a second depth position, the stereoscopic vision reference distance for the virtual object is determined such that the relative position of the virtual object with respect to the stereoscopic vision reference distance is a second relative position;

setting the pair of virtual cameras to obtain a view volume providing a predetermined sense of depth for the determined stereoscopic vision reference distance; and stereoscopically displaying the virtual object on the screen of the stereoscopic display device by using a pair of virtual images generated by imaging the virtual object with the set pair of virtual cameras.

20. The image display apparatus of claim 19, wherein when the virtual object is disposed between the first depth position and the second depth position, the stereoscopic vision reference distance for the virtual object is determined in accordance with a relative position of the virtual object with respect to the first depth position and the second depth position.

21. The image display apparatus of claim 20, wherein when the virtual object is disposed between the first depth position and the second depth position, the stereoscopic vision reference distance for the virtual object is determined based on a ratio of a distance between the first depth position and the second depth position and a distance between the depth position of the virtual object and the second depth position.

22. An image display system for stereoscopically displaying a virtual object, which is disposed in a virtual space, on a screen of a stereoscopic-viewing-enabling stereoscopic display device via a rendition of the virtual object with a pair of virtual cameras, the image display system comprising:

a computer processing system, including at least one processor, the computer processing system being configured to control the image display system to perform operations comprising:

determining a stereoscopic vision reference distance, which is a distance in an imaging direction from the pair of virtual cameras and which is used as a reference for a sense of depth of stereoscopic vision, so as to change in accordance with an imaging distance which is a distance from the virtual cameras to the virtual object in the imaging direction, wherein when the virtual object is disposed at a first depth position, the stereoscopic vision reference distance for the virtual object is determined such that a relative position of the virtual object with respect to the stereoscopic vision reference distance is a first relative position, and when the virtual object is disposed at a second depth position, the stereoscopic vision reference distance for the virtual object is determined such that the relative position of the virtual object with respect to the stereoscopic vision reference distance is a second relative position;

setting the pair of virtual cameras to obtain a view volume providing a predetermined sense of depth for the determined stereoscopic vision reference; and stereoscopically displaying the virtual object on the screen of the stereoscopic display device by using a pair of virtual images generated by imaging the virtual object with the set pair of virtual cameras.

23. The image display system according to claim 22, further comprising:

a predetermined recognition target; and the computer processing system being further configured to control the image display system to perform operations comprising:

detecting the predetermined target from at least one of a pair of real world images taken by a pair of imaging sections; and determining a relative positional relationship between the pair of virtual cameras and a predetermined point in the virtual space corresponding to the recognition target, based on a position of the recognition target in the at least one of the real world images, and determining the stereoscopic vision reference distance in accordance with a difference between the imaging distance and a distance from the one pair of virtual cameras to the predetermined point in the imaging direction.

24. The image display system according to claim 22, wherein when the virtual object is disposed between the first depth position and the second depth position, the stereoscopic vision reference distance for the virtual object is determined based on a ratio of a distance between the first depth position and the second depth position and a distance between the depth position of the virtual object and the second depth position.

25. An computer-implemented image display method for stereoscopically displaying a virtual object, which is disposed in a virtual space, on a screen of a stereoscopic-viewing-enabling stereoscopic display device via a rendition of the virtual object with a pair of virtual cameras, the method comprising:

determining a stereoscopic vision reference distance, which is a distance in an imaging direction from the pair of virtual cameras and which is used as a reference for a sense of depth of stereoscopic vision, so as to change in accordance with an imaging distance which is a distance from the virtual cameras to the virtual object in the imaging direction, wherein when the virtual object is disposed at a first depth position, the stereoscopic vision reference distance for the virtual object is determined such that a relative position of the virtual object with respect to the stereoscopic vision reference distance is a first relative position, and when the virtual object is disposed at a second depth position, the stereoscopic vision reference distance for the virtual object is determined such that the relative position of the virtual object with respect to the stereoscopic vision reference distance is a second relative position;

setting the pair of virtual cameras to obtain a view volume that provides a predetermined sense of depth for the determined stereoscopic vision reference distance; and stereoscopically displaying the virtual object on the screen of the stereoscopic display device by using a pair of virtual images generated from images of the virtual object obtained by the set pair of virtual cameras.

26. The computer-implemented image display method of claim 25, wherein when the virtual object is disposed between the first depth position and the second depth position, the stereoscopic vision reference distance for the virtual object is determined in accordance with a relative position of the virtual object with respect to the first depth position and the second depth position.

27. The computer-implemented image display method of claim 26, wherein when the virtual object is disposed between the first depth position and the second depth position, the stereoscopic vision reference distance for the virtual object is determined based on a ratio of a distance between the first depth position and the second depth position and a distance between the depth position of the virtual object and the second depth position.

* * * * *